United States Patent
Ellis et al.

(10) Patent No.: US 11,361,307 B1
(45) Date of Patent: Jun. 14, 2022

(54) INTEROPERABLE MOBILE WALLET REFUND

(71) Applicant: Wells Fargo Bank, N.A., San Francisco, CA (US)

(72) Inventors: Stephen M. Ellis, Tahoe City, CA (US); Michael J. Kennedy, San Francisco, CA (US); Ashish Bhoopen Kurani, Hillsborough, CA (US); Melissa Lowry, San Francisco, CA (US); Uma Meyyappan, Fremont, CA (US); Bipin Sahni, Pleasanton, CA (US); Nikolai Stroke, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 10 days.

(21) Appl. No.: 16/806,893

(22) Filed: Mar. 2, 2020

Related U.S. Application Data

(60) Continuation of application No. 15/975,478, filed on May 9, 2018, now Pat. No. 10,580,008, which is a
(Continued)

(51) Int. Cl.
*G06Q 20/36* (2012.01)
*G06Q 20/38* (2012.01)
(Continued)

(52) U.S. Cl.
CPC ........... *G06Q 20/367* (2013.01); *G06Q 20/20* (2013.01); *G06Q 20/202* (2013.01);
(Continued)

(58) Field of Classification Search
CPC .. G06Q 20/367; G06Q 20/405; G06Q 20/407; G06Q 20/20; G06Q 20/3676;
(Continued)

(56) References Cited

U.S. PATENT DOCUMENTS 5,943,423 A * 8/1999 Muftic ............... G06Q 20/3674
705/67
5,987,438 A * 11/1999 Nakano ................ G06K 7/0013
235/375

(Continued)

FOREIGN PATENT DOCUMENTS

| CA | 2574198 A1 * | 2/2006 | ........... G06Q 20/367 |
| WO | WO-2012005954 A1 * | 1/2012 | ......... G06Q 20/3674 |
| WO | WO-2012031905 A1 * | 3/2012 | ............. G06F 21/55 |

OTHER PUBLICATIONS

Bareisis, Z. (2011). Defining a payment services hub. Journal of Internet Banking and Commerce, 16(1), 1-16. Retrieved from https://www.proquest.com/scholarly-journals/defining-payment-services-hub/docview/876040059/se-2?accountid=14753 (Year: 2011).*

(Continued)

*Primary Examiner* — Ashford S Hayles
(74) *Attorney, Agent, or Firm* — Foley & Lardner LLP

(57) ABSTRACT

A computer-implemented method includes receiving, by a recipient bank computer system, a previously used token from a point of sale (POS) device, the previously used token identifying a previous transaction as transferring funds to a merchant from a payor associated with the recipient bank computer system. The method also includes transmitting, by the recipient bank computer system, the previously used token to a messaging hub computer system. The method also includes receiving, by the recipient bank computer system, at least one of a card number or a payment credential, from the messaging hub computer system, the at least one of the card number or the payment credential associated with the previous transaction. The method also includes processing, by the recipient bank computer system, a refund using the at least one of the card number or the payment credential.

20 Claims, 10 Drawing Sheets

Related U.S. Application Data continuation of application No. 15/423,449, filed on Feb. 2, 2017, now Pat. No. 9,972,012, which is a division of application No. 14/030,929, filed on Sep. 18, 2013, now Pat. No. 9,715,689.

(60) Provisional application No. 61/738,376, filed on Dec. 17, 2012.

(51) Int. Cl.
    *G06Q 20/20*     (2012.01)
    *G06Q 30/00*     (2012.01)
    *G06Q 20/40*     (2012.01)
    *G06Q 20/32*     (2012.01)

(52) U.S. Cl.
    CPC ....... *G06Q 20/322* (2013.01); *G06Q 20/3674* (2013.01); *G06Q 20/3676* (2013.01); *G06Q 20/385* (2013.01); *G06Q 20/405* (2013.01); *G06Q 20/407* (2013.01); *G06Q 30/016* (2013.01)

(58) Field of Classification Search
    CPC ............... G06Q 20/202; G06Q 20/322; G06Q 20/3674; G06Q 30/016; G06Q 20/385
    See application file for complete search history.

(56) References Cited

U.S. PATENT DOCUMENTS

| | | | |
|---|---|---|---|
| 6,173,272 B1 | 1/2001 | Thomas et al. | |
| 6,327,578 B1 | 12/2001 | Linehan | |
| 6,424,953 B1* | 7/2002 | Glassman | G06Q 20/06 380/268 |
| 7,257,554 B1* | 8/2007 | Glassman | G06Q 20/202 235/379 |
| 7,433,845 B1* | 10/2008 | Flitcroft | G06Q 40/00 705/44 |
| 7,502,761 B2 | 3/2009 | Siegal et al. | |
| 7,543,738 B1 | 6/2009 | Saunders et al. | |
| 7,734,527 B2* | 6/2010 | Uzo | G06Q 20/3672 705/37 |
| 8,417,633 B1 | 4/2013 | Chmara | G06Q 20/202 705/40 |
| 8,720,771 B2* | 5/2014 | MacKinnon | G06Q 30/02 235/375 |
| 9,195,984 B1* | 11/2015 | Spector | G06Q 20/322 |
| 9,355,393 B2* | 5/2016 | Purves | G06Q 20/36 |
| 10,354,321 B2* | 7/2019 | Royyuru | G06Q 20/352 |
| 2002/0161645 A1 | 10/2002 | Walker et al. | |
| 2002/0194080 A1 | 12/2002 | Lourie | |
| 2002/0194128 A1* | 12/2002 | Maritzen | G06Q 20/00 705/40 |
| 2003/0042301 A1* | 3/2003 | Rajasekaran | G06Q 20/02 235/380 |
| 2003/0200184 A1* | 10/2003 | Dominguez | G07F 7/10 705/78 |
| 2004/0077332 A1* | 4/2004 | Ephraim | H04M 15/55 455/405 |
| 2004/0153402 A1* | 8/2004 | Smith | G06Q 20/04 705/39 |
| 2004/0167854 A1* | 8/2004 | Knowles | G06Q 20/105 705/41 |
| 2005/0125343 A1 | 6/2005 | Mendelovich | |
| 2006/0054695 A1 | 3/2006 | Owada | |
| 2006/0116940 A1 | 6/2006 | Dippold et al. | |
| 2007/0033070 A1 | 2/2007 | Beck et al. | |
| 2007/0250440 A1* | 10/2007 | Paulsen | G06Q 20/0855 705/39 |
| 2007/0267479 A1* | 11/2007 | Nix | G07F 17/24 235/379 |
| 2007/0276765 A1* | 11/2007 | Hazel | G06K 7/082 705/71 |
| 2008/0183621 A1 | 7/2008 | Evans | |
| 2008/0207203 A1 | 8/2008 | Arthur et al. | |
| 2008/0208744 A1* | 8/2008 | Arthur | G06Q 20/105 705/41 |
| 2009/0024527 A1* | 1/2009 | Sellen | G06Q 20/20 705/44 |
| 2009/0048953 A1* | 2/2009 | Hazel | G07F 7/1008 705/35 |
| 2009/0112747 A1 | 4/2009 | Mullen et al. | |
| 2009/0254440 A1 | 10/2009 | Pharris | |
| 2010/0145860 A1 | 6/2010 | Pelegero | |
| 2010/0153273 A1 | 6/2010 | Sellars et al. | |
| 2010/0217710 A1* | 8/2010 | Fujita | G06Q 20/38215 705/71 |
| 2010/0306168 A1 | 12/2010 | Ostad et al. | |
| 2010/0312704 A1* | 12/2010 | Rohatgi | G06Q 20/40 705/44 |
| 2011/0087537 A1* | 4/2011 | Hanafi | G06Q 20/20 705/14.34 |
| 2011/0137797 A1 | 6/2011 | Stals et al. | |
| 2011/0161233 A1* | 6/2011 | Tieken | G06Q 20/4014 705/71 |
| 2011/0191250 A1 | 8/2011 | Bishop et al. | |
| 2011/0258062 A1* | 10/2011 | Hirson | G06Q 30/06 705/26.1 |
| 2011/0276478 A1 | 11/2011 | Hirson et al. | |
| 2012/0011072 A1* | 1/2012 | Lodolo | G06Q 30/012 705/302 |
| 2012/0035997 A1* | 2/2012 | Burgess | G06Q 30/02 705/14.17 |
| 2012/0084200 A1 | 4/2012 | Triana | |
| 2012/0185322 A1* | 7/2012 | Shipley | G06Q 30/02 705/14.34 |
| 2012/0203700 A1* | 8/2012 | Ornce | G06Q 20/3278 705/67 |
| 2012/0259698 A1 | 10/2012 | Yurow | |
| 2012/0259782 A1* | 10/2012 | Hammad | G06Q 20/382 705/44 |
| 2012/0271660 A1* | 10/2012 | Harris | G06Q 20/12 705/4 |
| 2012/0290376 A1 | 11/2012 | Dryer et al. | |
| 2012/0316992 A1* | 12/2012 | Oborne | G06Q 20/386 705/26.41 |
| 2012/0323786 A1 | 12/2012 | Kirsch | |
| 2013/0080318 A1* | 3/2013 | Katz | G06Q 40/00 705/39 |
| 2013/0103574 A1* | 4/2013 | Conrad | G06Q 20/36 705/39 |
| 2013/0110658 A1* | 5/2013 | Lyman | G06Q 20/327 705/18 |
| 2013/0117138 A1* | 5/2013 | Hazel | G06Q 20/40 705/16 |
| 2013/0132219 A1* | 5/2013 | Liberty | G06Q 20/36 705/21 |
| 2013/0151400 A1 | 6/2013 | Makhotin et al. | |
| 2013/0198080 A1* | 8/2013 | Anderson | G06Q 20/26 705/44 |
| 2013/0238455 A1* | 9/2013 | Laracey | G06Q 20/108 705/21 |
| 2013/0238492 A1* | 9/2013 | Muthu | G06Q 20/385 705/39 |
| 2013/0246259 A1* | 9/2013 | Dessert | G06Q 20/405 705/41 |
| 2013/0256403 A1* | 10/2013 | MacKinnon | G06Q 20/3276 235/375 |
| 2013/0282588 A1* | 10/2013 | Hruska | G06Q 20/40 705/67 |
| 2013/0282589 A1 | 10/2013 | Shoup et al. | |
| 2013/0339253 A1* | 12/2013 | Sincai | G06Q 20/3276 705/71 |
| 2014/0006224 A1* | 1/2014 | Grigg | G06Q 10/0837 705/28 |
| 2014/0032419 A1* | 1/2014 | Anderson | G06Q 20/3672 705/78 |
| 2014/0040130 A1* | 2/2014 | Kunz | G06Q 20/00 705/44 |

(56) References Cited

U.S. PATENT DOCUMENTS

| | | | | |
|---|---|---|---|---|
| 2014/0040131 A1* | 2/2014 | Andrews | ............... | G06Q 30/00 705/44 |
| 2014/0040147 A1* | 2/2014 | Varadarajan | ....... | G06Q 20/3823 705/71 |
| 2014/0040148 A1* | 2/2014 | Ozvat | ............... | G06Q 20/3829 705/71 |
| 2014/0108260 A1* | 4/2014 | Poole | .................. | G06Q 20/321 705/64 |
| 2014/0114853 A1* | 4/2014 | Guedj | .................... | G06Q 20/12 705/44 |
| 2014/0143146 A1* | 5/2014 | Passanha | .......... | G06Q 20/3821 705/44 |
| 2014/0149285 A1* | 5/2014 | De | .................... | G06Q 20/3276 705/41 |
| 2014/0164243 A1* | 6/2014 | Aabye | ............... | G06Q 20/3821 705/44 |
| 2014/0344153 A1* | 11/2014 | Raj | ................... | G06Q 20/3821 705/44 |
| 2014/0351070 A1* | 11/2014 | Christner | ............ | G06Q 20/023 705/18 |
| 2014/0351132 A1* | 11/2014 | Wieler | .................. | G06Q 20/40 705/44 |
| 2015/0026070 A1 | 1/2015 | Groarke et al. | | |
| 2015/0032622 A1* | 1/2015 | Powell | .................. | G06Q 30/06 705/44 |
| 2015/0032626 A1* | 1/2015 | Dill | ....................... | G06Q 20/40 705/44 |
| 2015/0032627 A1* | 1/2015 | Dill | ....................... | G06Q 20/40 705/44 |
| 2015/0248664 A1 | 9/2015 | Makhdumi et al. | | |
| 2017/0161701 A1* | 6/2017 | Amancherla | ....... | G07F 17/3244 |

OTHER PUBLICATIONS

Mann, Ronald J. "Regulating Internet Payment Intermediaries." Texas law review 82.3 (2004): 681-. Print. (Year: 2004).*

Ruiz-Martínez, Antonio, and C Inmaculada Marín-López. "A Lightweight Payment Scheme for Real-Time Services Based on SIP." EURASIP journal on wireless communications and networking 2012.1 (2012): 1-25. Web. (Year: 2012).*

Kim, S, and H Oh. "A New Electronic Check System with Reusable Refunds," International journal of information security 1.3 (2002): 175-188. Web. (Year: 2002).*

Mohanty, R.P, D Seth, and S Mukadam. "Quality Dimensions of E-Commerce and Their Implications." Total quality management & business excellence 18.3 (2007): 219-247. Web. (Year: 2007).*

Daswani, Neil et al. "Swaperoo: A Simple Wallet Architecture for Payments, Exchanges, Refunds, and Other Operations." USENIX Workshop on Electronic Commerce (1998).

* cited by examiner

INTEROPERABLE MOBILE WALLET
REFUND

CROSS-REFERENCE TO RELATED PATENT
APPLICATIONS

This application is a continuation of U.S. patent application Ser. No. 15/975,478, filed May 9, 2018, which is a continuation of U.S. patent application Ser. No. 15/423,449, filed Feb. 2, 2017, which is a divisional of U.S. patent application Ser. No. 14/030,929, filed Sep. 18, 2013, which claims the benefit of U.S. Provisional Application No. 61/738,376, filed Dec. 17, 2012, all of which are incorporated herein by reference in their entireties.

FIELD

The present disclosure relates generally to the field of systems that use mobile devices to transfer funds. More specifically, the present disclosure relates to systems and methods for enabling individuals to use their electronic devices to transfer funds, purchase products, receive refunds and services.

BACKGROUND

Payments for products and services are often completed using credit cards, debit cards, checks or cash. At the same time, most people carry some type of mobile handheld electronic device, such as a cellular phone, smart phone, mobile handheld wireless e-mail device, personal digital assistant, portable gaming devices, and so on. Most of these devices tend to have a wireless Internet connection. A person may wish to make payments to or receive refunds from merchants or other individuals using these mobile devices. Likewise, a person may wish to transfer funds to or receive funds from other individuals using their mobile devices. Enhanced systems and methods of facilitating such transactions would be desirable.

SUMMARY

One embodiment includes a computer-implemented method for providing a computer-implemented system and method that includes receiving, by a messaging hub computer system, from a point of sale (POS) device of a merchant, a request to process a refund for a transaction that occurred between the merchant and a mobile device of a payor, the request comprising a previously used code that was exchanged between the POS device and the mobile device. The method includes determining, by the messaging hub computer system, a first financial institution based at least partially on a portion of the code, and receiving, from a computer system of the first financial institution, payment credential information of an account held by the payor to process the refund using the payment credential information. The method may further include transferring, by the messaging hub computer system, the refund from an account held by the merchant to the account held by the payor.

One embodiment includes a computer system that includes a processor coupled to machine readable storage media having instructions stored therein that, when executed by the processor, cause the processor to transmit, by a recipient bank computer system, a refund transaction request for a previous transaction between a merchant and a payor, to a messaging hub computer system, the refund transaction request including a previously used dynamic token, a refund transaction amount, and an indication that the transaction is a refund transaction. The processor configured to receive from the messaging hub computer system underlying payment credential information for an account held by the payor that was used for the previous transaction and transfer, by the recipient bank computer system, the refund from an account held by the merchant to the account held by the payor.

A computer-implemented method for performing a transaction, the method includes receiving, by a POS (Point of Sale) device, a previously used dynamic token from a mobile device for a refund transaction, the previously used dynamic token identifying a previous transaction that transferred funds to a merchant from a payor, and determining the transaction amount for the previous transaction using the previously used dynamic token. The method further includes transmitting the previously used dynamic token and the transaction amount to a recipient bank computer system and receiving an approval/decline indicator for the refund transaction from the recipient bank computer system. The method includes generating a receipt approving or declining the refund transaction for the payor.

DETAILED DESCRIPTION

Figure 1:
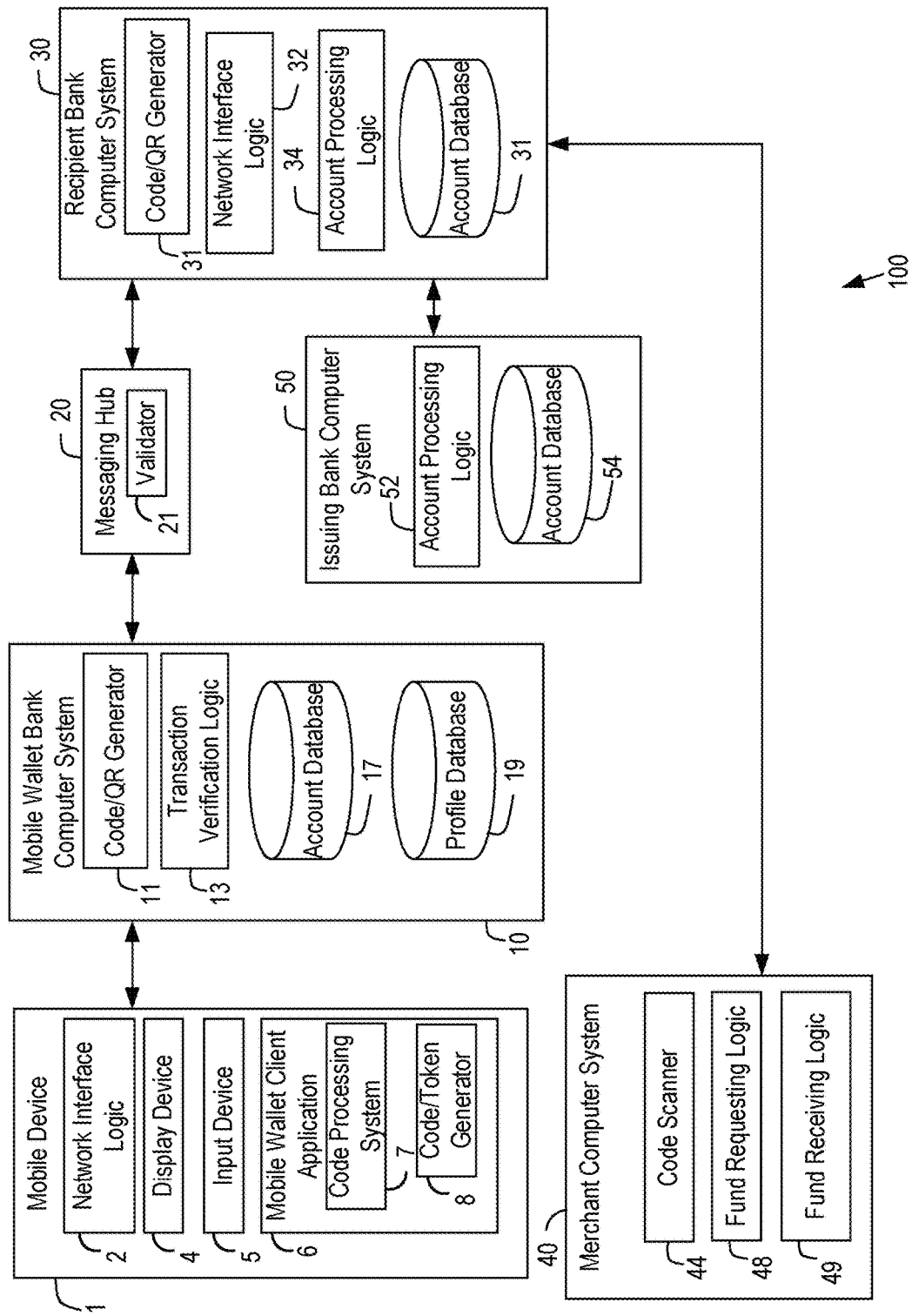
FIG. 1 is a schematic diagram of a computer-implemented payment processing system according to an example embodiment.

Referring to FIG. 1, a computer-implemented payment processing system 100 is shown that may be used to set up and utilize a mobile wallet account. The user may be a business entity and/or an individual consumer that has one or more source accounts with a financial institution. The source accounts may include business or consumer demand deposit accounts. The mobile wallet account can be created for the user to transmit funds from a demand deposit account in return for purchase of goods or services to a merchant. Additionally, funds can be transferred from the demand deposit account to another person.

FIG. 1 is a schematic diagram of a computer-implemented payment processing system according to an example embodiment. In the example of FIG. 1, an interoperable mobile wallet platform is provided that may be accessed by consumers that bank at various different banking institutions and by merchants that bank at various different banking institutions. Hence, the mobile wallet client application 6 (or various branded variations thereof) may be offered through multiple banks and may utilize the services of multiple banks to complete transactions. Such an arrangement may promote broader adoption of the mobile banking platform by merchants and consumers.

Specifically, as shown in FIG. 1, a payment processing system 100 may include various computer systems such as a mobile device 1, mobile wallet bank computer system 10, messaging hub computer system 20, recipient bank computer system 30 and merchant computer system 40. As will be appreciated, in practice, the computer system of a given banking institution may operate as the mobile wallet bank computer system in the context of some transactions and may operate as the recipient bank computer system in the context of other transactions.

In FIG. 1, the computer systems 1, 10, 30, 40 and 50 may communicate with each other to complete transactions. As shown in FIG. 1, the connection of mobile device 1 is such that it does not communicate directly with the messaging hub computer system 20 or the recipient bank computer system 30. In other implementations, the mobile device 1 may be configured to communicate some information to the messaging hub computer system 20 and/or the recipient bank computer system 30. Interconnections of the computer systems 1, 20, 30, 40 and 50 will now be briefly described.

The mobile device 1 may be used by an individual user (e.g., a business owner or employee, a consumer, and so on) to create and interact with a mobile wallet account. The mobile device 1 may, for example be, a handheld computer, a cellular phone, smart phone, mobile handheld wireless e-mail device, personal digital assistant, portable gaming devices, or other suitable device. The mobile device 1 comprises a network interface logic 2, a display device 4, an input device 5, and a mobile wallet client application 6. Network interface logic 2 may include, for example, program logic that connects the mobile device 1 to a network. As described in greater detail below, for example, the mobile device 1 may receive and display screens including account information, transaction instructions, and so on. In an example embodiment, such screens may be used to request username and password information. Such screens may also be used to prompt the user to provide information regarding the amount of the payment and which merchant or individual (e.g., name, address, phone number or e-mail, a selection of a recipient by the user from his memory or from by the user from the mobile device 1, and so on) is to receive the payment. Such screens are presented to the user via the display device 4. The input device 5 may be used to permit the user to initiate account access and to facilitate receiving requested information from the user. As will be appreciated, in addition to or instead of the mobile device 1, users may also be provided with the ability to access the payment processing system 100 using another type of computer (e.g., a desktop or laptop computer executing browser software) to perform the operations described herein as being performed by the mobile device 1.

The mobile wallet client application 6 may comprise program logic executable by the mobile device to implement at least some or all of the functions described herein. As will be appreciated, the level of functionality that resides on the mobile device 1 as opposed to the banking computer system 30 may vary depending on the implementation. The client application 6 may be a web browser that is configured to receive and display mobile web pages (e.g. web pages prompting the user to provide information to create an account, web pages displaying account balance information and past transactions, and so on). The mobile wallet client application 6 may also include a code/token generator capable of generating a unique code/token for each transaction. As described below, the unique code/token may then be transmitted by the mobile device 1 as part of a transaction to facilitate authentication of the transaction. As will be appreciated, the user may also use other devices (e.g., laptop or desktop computer system, not shown) to create and access account.

In FIG. 1, the mobile wallet application 1 is used in connection with merchant computer system 40 located at a bricks and mortar store location. As previously indicated, however, the mobile wallet application 6 may also be used in connection with online merchant transactions. For example, in another embodiment, merchants may be provided with the ability to have a mobile storefront and profile within the mobile wallet application 6. For example, merchants may be provided with the ability to display marketing material, provide information, and promote products or discounts. Merchants may also be provided with the ability to sell items directly through their mobile storefront for the account holder to purchase from within the mobile application 6.

The mobile device 1 may include, in addition to the other features previously described, a code processing system 7. The code processing system 7 may include a code scanner (i.e. camera), and/or a code generator. In one embodiment, the code processing system 7 may receive a numerical code from the mobile wallet bank computer system 10 and generate an image that represents the received code on the display device 15. In one implementation the code processing system 7 may receive a code from the mobile wallet bank computer system 10. In another embodiment, the code processing system 7 may use a code/token generator as described in FIG. 1. The code generator 8 of the mobile device 1 may generate or receive a unique code for a transaction at a point of sale location. The unique code may identify the transaction number for the mobile wallet bank computer system 10. In some embodiments, the code may be a dynamic token that remains valid for a single transaction, and/or a temporary period of time. The code is a POS exchange code that is exchanged between a POS (Point of Sale) device 40 of the merchant and a mobile device 1 of the user in exchange for goods or services that are received by the user.

The bank computer system 10 includes code/QR generator 11, transaction verification logic 13, code determination logic 15, account database 17, and profile database 19. The code generator 11 may receive a request from an account holder to initiate a transaction. A transaction may be initiated by generating a QR code that can be scanned by a merchant or individual. The account holder may access the code generator 11 via a mobile wallet application that is being executed on the mobile device 1. In various embodiments, the QR code may be generated without the account holder providing the merchant's name or amount of transaction. The code generator 11 can be configured to generate a QR code that incorporates at least one of a date, time, unique transaction identifier, and geographic location of the mobile device. In other embodiments, the code generators 11 and 18 can be configured to generate optically scanned or non-optically scanned codes. Examples of optically scanned codes include bar codes, two dimensional codes (e.g. QR code and other similar codes), three dimensional codes (e.g. QR code with color and others characteristics), and four dimensional codes (e.g. QR code with color and timestamp information). Examples of non-optically scanned codes may include, near field communication (NFC), RFID, HID or other RF signal to transmit the code.

The transaction verification logic 13 may receive a transaction amount from the messaging hub computer system 20. The transaction verification logic 13 may generate a message to send to the mobile device 1 for verifying the transaction amount. Upon receiving the verification message, the account holder via mobile device 1 may approve the transaction amount to the bank computer system 10.

The account database 17 may store details regarding financial institution accounts. In particular, the account database 17 may store each financial transaction that occurred. Each financial transaction may include the amount of the transaction and the merchant. In some embodiments, the messaging hub computer system 20 stores account information for the user, so the account information is not received from the mobile wallet bank computer system 10.

The profile database 19 may store other information regarding the account holder. For example, the profile database 19 may store information useful for generating offers and advertisements that are selected specifically for the account holder. In some embodiments, the messaging hub computer system 20 may also be operative to process the transaction between the two parties.

As shown in FIG. 1, the mobile wallet bank computer system 10 is configured to communicate with the mobile device 1 and the messaging hub computer system 20. The content of the communication with the messaging hub computer system 20 may include account information regarding the user, confirmation of the code and approval/declining a transaction between the user of the mobile device 1 and a merchant.

As shown in FIG. 1, the messaging hub computer system 20 is configured to communicate with one or more financial institutions that provide financial accounts to various individuals or merchants. The messaging hub computer system 20 may include various components such as validator 21 discussed in greater detail below. The messaging hub computer system 20 is configured to act as an intermediary between two financial institutions such as mobile wallet bank computer system 10 and recipient bank computer system 30. The messaging hub computer system 20 may act as a message router that is configured to assure that the correct information is transmitted to the correct financial institution to facilitate a transaction between two parties (e.g. a user and a merchant or a user and another user or between two merchants). Additionally, the messaging hub computer system 20 provides a single interface for each bank to communicate with a plurality of other banks.

The messaging hub computer system 20 may be a third party provided interface for one or more financial institutions. In one embodiment, the messaging hub computer system 20 may be provided by an exchange service that allows banks to transmit information securely between banks to process transactions where funds are transferred from one bank to another bank. In the example shown in FIG. 1, funds may be transferred from an account held by the user of the mobile device 1 to an account held by a merchant with a merchant computer system 30. The messaging hub computer system 20 includes a processor and a non-transitory memory that are configured to receive and transmit information between one or more financial institutions. The information received from a sending financial institution may identify the recipient financial institution. The interface between the messaging hub computer system 20 and the financial institutions uses bank level security encryption to send and receive messages.

The validator 21, in the messaging hub computer system 20, performs an initial validation of the code that is received from the recipient bank computer system 30. In another embodiment, a portion of the received code may identify the financial institution that should receive the messages from the messaging hub computer system 20. The validator 21 may access stored information that correlates codes with electronic contact information for financial institutions. In another implementation, a database may be used to determine the correlation between a portion of the code and a financial institution with which the code corresponds.

The validator 21 includes a comparator configured to compare the time provided by the merchant computer system 40 with the time provided via the QR code generated by the mobile device 1. If the time provided by the QR code and the merchant computer system 40 exceeds a predetermined time limit (e.g., five minutes), the messaging hub computer system 20 will deny the transaction.

The recipient bank computer system 30 includes network interface logic 32, account processing logic 34, and accounts database 36. When the mobile wallet account is created, the user is prompted to provide bank account information (e.g., routing number and/or account number) for the source account that is used as a source of funds for the mobile wallet account. Thus, the financial institution that provides the mobile wallet account for the user and the financial institution that typically provides banking services to the user may be two different financial institutions.

In another embodiment, the code generator 31 may receive a request for a code to provide to a merchant, the code being generated to be displayed on a merchant point of sale machine or an ecommerce website. The merchant may display the code for the account holder to scan using a mobile device. Generating the code including embedding in the code a transaction identification number, a geographic location of the merchant, and a timestamp. The financial institution may send the code to the merchant for the mobile device to scan. The mobile device 1 may scan the code from a merchant display device. The mobile device 1 may amend the code to add further authentication information to the code and send the code to the financial institution. The financial institution may receive the amended code from the mobile device to transfer funds from an account held by the account holder to the merchant. In one embodiment, the requested funds are transferred to the merchant upon verifying the geographic location of the mobile device to be within a predetermined distance of the location of the merchant. In another embodiment, the amended code is amended to include authentication information (e.g. geographic location, account number, pass code, pin code) from the mobile device for the financial institution.

The merchant computer system 40 may be configured in generally the same manner as the other computer systems described herein. For example, if the fund recipient is an individual, the computer system 40 may be another mobile device, such as a handheld computer, cellular phone, smart phone, mobile handheld wireless e-mail device, personal digital assistant, portable gaming devices, or other suitable device. If the fund recipient is a merchant (e.g., a brick and mortar merchant, a retail website or other online merchant, etc.), the computer system 40 may comprise a point of sale (POS) device or other computer system (e.g., one or more servers each with one or more processors) configured to execute instructions, send and receive data stored in memory, and perform other operations to implement the operations described herein associated with the fund recipient.

The merchant computer system 40 may be used at a point of sale to conduct transaction with the account holder. For example, the merchant computer system 40 may comprise a point of sale computer system such as a cash register system connected to a central server system operated by the merchant. As another example, the merchant computer system 40 may comprise a mobile computing device (e.g., smart phone, tablet PC, etc.) operated by a store clerk as the clerk moves throughout the store. Again, the mobile computing device in such an embodiment may connect to a central server system operated by the merchant.

The merchant computer system 40 includes code scanner 44, fund requesting logic 48, and fund receiving logic 49. The code scanner 44 may be configured to scan codes, such as but not limited to, optically scanned or non-optically scanned codes. Examples of optically scanned codes include bar codes, two dimensional codes (e.g. QR code and other similar codes), three dimensional codes (e.g. QR code with color and others characteristics), and four dimensional codes (e.g. QR code with color and timestamp information). Examples of non-optical codes include, near field communication (NFC), RFID, HID or other RF signal to transmit the code. Code scanner 44 may include a light emitting device that scans a code using infrared, laser, or other types of communication technology. In one embodiment, the code scanner 44 scans a QR code. After scanning the QR code the QR code scanner 44 determines the information that was incorporated into the QR code by the mobile device 1 that generated the code.

The fund requesting logic 48 communicates a fund request to the recipient bank computer system 130. In one embodiment, the fund requesting logic 48 also sends the amount of transaction to the financial transaction.

The merchant computer system 40 may further connect to or integrate with other hardware. For example, in one embodiment, the merchant computer system 40 may connect to a card reader for reading credit cards, debit cards, stored value cards, and so on. As another example, the merchant computer system 40 may be configured to prompt the user to provide a random security code. The random security code may be generated by the mobile device 1, by a separate security dongle, or in another manner. The security code may be provided to the merchant computer system 40 directly by the mobile device, may be keyed into the merchant computer system (e.g., by a store clerk), or may be received in another manner.

After scanning the QR code, the merchant may transmit the QR code to the recipient bank computer system 30, as previously described. The recipient bank computer system 30 may then return account information (e.g., a credit card number, debit card number, alternative payment type, demand deposit account, etc.) to backend servers associated with the merchant computer system 40 to permit the transaction to be processed in the same manner as a conventional credit card or debit card transaction. Other mechanisms for processing payments may also be used.

As shown in FIG. 1, the recipient bank computer system 30 is configured to communicate with the merchant computer system 40 and the messaging hub computer system 20. The recipient bank computer system 30 is configured to receive funds to the financial institution of the user (e.g. mobile wallet bank computer system 10). In other implementations, the recipient bank computer system 30 may be configured to communicate with the mobile device 1 and/or the mobile wallet bank computer system 10.

As shown in FIG. 1, the merchant computer system 40 is configured to communicate with the recipient bank computer system 30 and the mobile device 1. The merchant computer system 40 is configured to receive a code (e.g. QR code) and other information from the recipient bank computer system 30. In other implementations, the merchant computer system 40 may be configured to communicate with the mobile device 1 and/or the mobile wallet bank computer system 10. The interface between the merchant computer system 40 and the recipient bank computer system 30 uses bank level security encryption to send and receive messages.

As shown in FIG. 1, the issuing bank computer system 50 is operative to transfer funds from the demand deposit account held by the user to the recipient bank computer system 30 under the direction of the recipient bank compute system 30 or the messaging hub computer system 20. The issuing bank computer system 50 may be configured to communicate via a network with the messaging hub computer system 20, the mobile wallet bank computer system 10 and the recipient bank computer system 30. The issuing bank computer system 50 is configured to receive funds from various mobile wallet bank computer systems 10 and transmit the funds to the appropriate recipient bank computer systems 30. The issuing bank computer system 50 may include an account processing logic 52 that determines which user has a credit card account and an account database that store information regarding user accounts. In other embodiments, the issuing bank computer system 50 is configured to be a registry information provider. The registry information may include an identifier for the user mobile wallet account and the registry information such as the user default account number may be provided to the messaging hub computer system 20. In other embodiments, the registry information may include other information that allows the messaging hub computer system 50 to obtain the account information from another financial institution.

As will appreciated, during operation of the system shown in FIG. 1, various parameters may be passed between the computer systems 1, 20, 30, 40 and 50. An exemplary listing of such parameters is set forth below in Table 1. These parameters may be alphanumeric values.

TABLE 1

| Term | Definition |
| --- | --- |
| Payment Identifier (PI) | A static value that is tied to an underlying payment type or consumer registry info |
| Issuer Identifier (II) | A unique number that identifies the issuer to ensure appropriate routing of Dynamic Token requests |
| Wallet Platform ID (WPI) | A unique ID per Wallet/Version combo |
| Wallet User ID (WUI) | A unique ID per user of each wallet |
| Dynamic Token (DT) | A tokenized value that is sent to the issuer or acquirer for validation and retrieval of key information to drive a purchase transaction |
| Previously Used Dynamic Token (PUDT) | A previously used tokenized value that is used to drive a refund transaction |
| Trace ID (TID) | A subset of the Dynamic Token that is used by the issuer for security and matching purposes |
| Merchant ID (MID) | A unique ID for each merchant that is tied to a Merchant Registry Info |
| Acquirer ID (AID) | A unique ID for each acquirer/processor |
| POS ID (PID) | A unique ID for each point of sale terminal |
| Merchant Registry Info (MM) | A Merchant specific data element that allows MH to look up the DDA or other profile info |
| Consumer Registry Info (CRI) | A Consumer ID that allows MH to look up the DDA or other profile info |

Figure 2A:
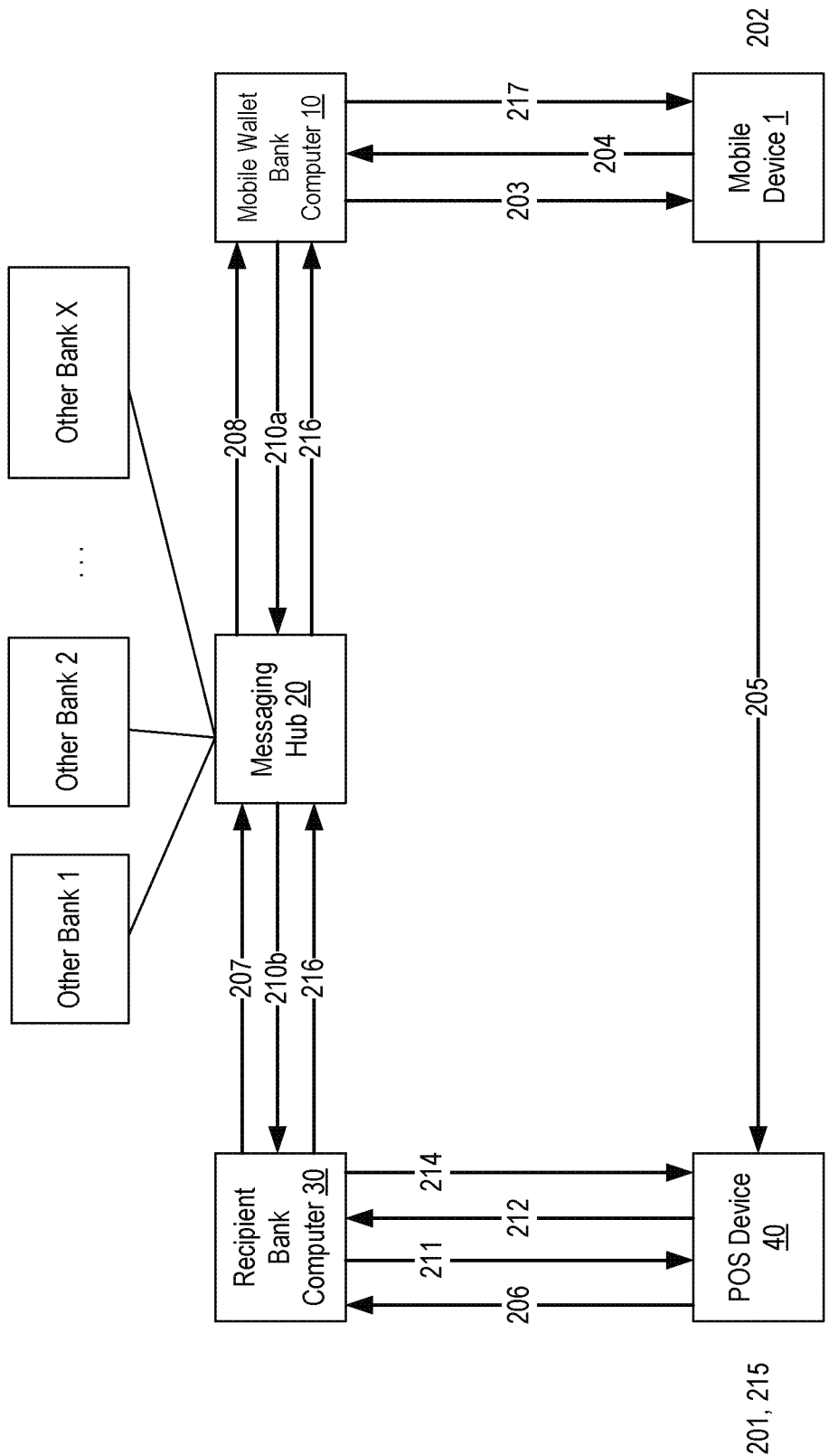
FIG. 2a is a process implemented by the payment processing system of FIG. 1.

FIG. 2a depicts a first process for completing a transaction that may be implemented by the payment processing system of FIG. 2a. For purposes of providing an example, it is assumed that the two parties to the transaction in FIG. 2a are a user of mobile wallet application 6 (e.g., consumer) and a merchant. Again, as above, it will be appreciated that other types of transactions may be possible.

At step 201, the user may provide input to the POS (Point of Sale) device 40. For example, a user purchasing merchandise at a bricks and mortar merchant may be at a checkout counter or other type of POS arrangement. The user may be presented with a series of payment options at the POS device 40 (e.g., credit card, debit card, mobile, and so on). The user may select a payment type (here, "mobile") to pay for goods or services, and the POS device 40 may receive the selection of the payment option.

Next at step 202, the user may access the mobile wallet application 6 on mobile device 1 and select a "pay now" or similar option on the mobile device. As previously discussed, the mobile wallet application 6 may also offer the user various payment types (e.g., various credit cards, debit cards, alternative payment type, demand deposit account and so on). In one embodiment, the user may have pre-specified a default payment type that may be used. The mobile device 1 may receive the user input and initiate communication with the mobile wallet bank computer system 10.

At step 203, the mobile device 1 may send a request to the mobile wallet bank computer system 10 for a code that may be used to identify the transaction that will occur between the user and the POS device 40. The request to the mobile wallet bank computer system 10 includes the wallet platform ID (WPI) that identifies a unique identification number for the wallet and/or the version of the wallet application that is being used. The message that is transmitted may include information identifying the user (e.g., a device identifier for the mobile device 1, a unique identifier (e.g., wallet user ID (WUI)) associated with the mobile wallet application 6 when installed by the user, etc.). Information regarding the payment type selected by the user may also be sent. The mobile wallet bank computer system 10 may be configured to receive requests directly from the mobile device 1 for codes or other information.

At step 204, the mobile wallet bank computer system 10 may generate a random code or sequential code as described above, e.g., in connection with FIG. 1. In one embodiment, the code may represent a unique identifier (e.g., dynamic token (DT)) for the transaction that is about to be completed between the user and the merchant. In other embodiments, the code may also include a transaction identifier and verification codes that identify the mobile wallet bank computer system 10 to the messaging hub computer system 20 when the code is received by the messaging hub computer system 20. In other embodiments, the code may include a trace ID (TID) which is part of the dynamic token and is used by the issuing bank for security and matching purposes. In some embodiments, the mobile wallet bank computer system 10 may generate a code based on a standard that the messaging hub computer system 20 can decode and understand.

After receiving the code from the mobile wallet bank computer system 10, the mobile device 1 may process the code using the code processing system 7. In one embodiment, the code may be sent over a wireless link between the mobile device 1 and the mobile wallet bank computer system 10. In one embodiment, to reduce bandwidth requirements and transmission times, the code may be sent as a numeric code. In such an embodiment, the code processing system 7 may be configured to convert the code into a displayable image that may be scanned by the POS device 40. In other embodiments, the code may be sent as an image (e.g., QR code or bar code). At step 205, the mobile device 1 may generate a display and the POS device 40 may optically scan the displayed code.

At step 206, after scanning the code from the mobile device 1, the code and a merchant identification number (e.g., Merchant ID (MID) that represents a unique identifier for the merchant that is tied the merchant registry information in the messaging hub computer system 20) from the POS device 40 is transmitted to the recipient bank computer system 30. At step 207, after receiving the code, the recipient bank computer system 30 may be configured to transmit the code and the merchant identification number to the messaging hub computer system 20. Upon receiving the code, the messaging hub computer system 20 may perform an initial validation of the code and then decode it to determine the banking institution (e.g., issuer identifier (II) or wallet platform ID (WPI)) with which it is associated (i.e., to determine which banking institution generated the code). In some embodiments, the code or a portion of the code (e.g., TID) may be matched with a number that identifies the banking institution (e.g., the last three or four digits may be used to access a lookup table).

Next, at step 208, the code and the merchant identification number is sent to the mobile wallet bank computer system 10. At step 209, the mobile wallet bank computer system 10 confirms the code's validity. Details of the code (TID) may be compared against codes previously generated by the mobile wallet bank computer system 10 (in this example, the code is the same as that generated in step 204). Additionally, the mobile wallet bank computer system 10 may confirm that the code has not expired. For example, the code that was originally generated at step 204 may expire within a predetermined period of time, such as, 15 minutes, 10 minutes, 5 minutes, or another period of time. Also, the mobile wallet bank computer system 10 may confirm that the code has not already been used for another transaction.

At step 210a, upon verifying the code, the mobile wallet bank computer system 10 transmits the messaging hub computer system 20 payment information (e.g. account information) for the payment account to be used for the transaction. The payment information may be the payment identifier (PI) in one embodiment. For example, a credit card or debit card number, demand deposit account or alternative payment of the user may be transmitted. Additionally, the mobile wallet bank computer system 10 may send stored merchant loyalty information to the messaging hub computer system 20. After step 210a, the messaging hub computer system 20 transmits the payment information and the loyalty information to the recipient bank computer system 30.

Next, at step 211, the recipient bank system 30 transmits the loyalty information to the POS device 40. At step 212, the POS device 40 uses the loyalty information to calculate the final transaction amount and transmits the transaction amount to the recipient bank computer system 30. At step 213, upon receiving the transaction amount, the recipient bank system 30 processes the transaction using the payment information received from the messaging hub computer system 20. For example, if a credit card number is received, the recipient bank system 30 may submit the credit card transaction for approval and the credit card transaction may be processed as a standard four party credit card transaction between a customer, a merchant, an issuing bank and an acquiring bank.

Next, at step 214, the recipient bank system 30 provides an indication whether the transaction is approved or declined to the POS device 40. Next, at step 215, the POS device 40 prints a receipt for the user. As another example, the user may opt via the mobile wallet application 6 to have the receipt sent electronically to the mobile device 1 via the messaging hub computer system 20.

Next at step 216, the recipient bank system 30 provides an indication whether the transaction is approved or declined to the mobile wallet bank computer system 10 through the messaging hub computer system 20. At step 217, the mobile wallet bank computer system 10 sends a notification to the mobile wallet application. Based on this information, a message may be displayed to the user via the mobile device 1 at the point of sale indicating whether the transaction was approved or declined.

In various embodiments, each message that is transmitted for steps 201 to 217 includes the code to identify the transaction. The banks computer systems 10 and 30 and the messaging hub computer system 20 may receive the sensitive account information (e.g., credit card number) during the various steps discussed herein, however, the POS device 40 or the mobile device 1 need not receive the user's account information. Hence, account security may be enhanced. The messaging hub computer system 20 facilitates a secure transmission of sensitive information and aids the banks by providing a single point of contact. Moreover, the messaging hub computer system 20 creates a messaging format that each banking entity must comply with for the messages.

In the embodiment of FIG. 2a, a code is generated on the display of the mobile device 110 and the code is displayed for optical scanning by the POS device 40. Hence, the user presents the mobile device for scanning at the time of sale, creating a user experience for the user that is somewhat similar to presentation of a credit card.

Figure 2B:
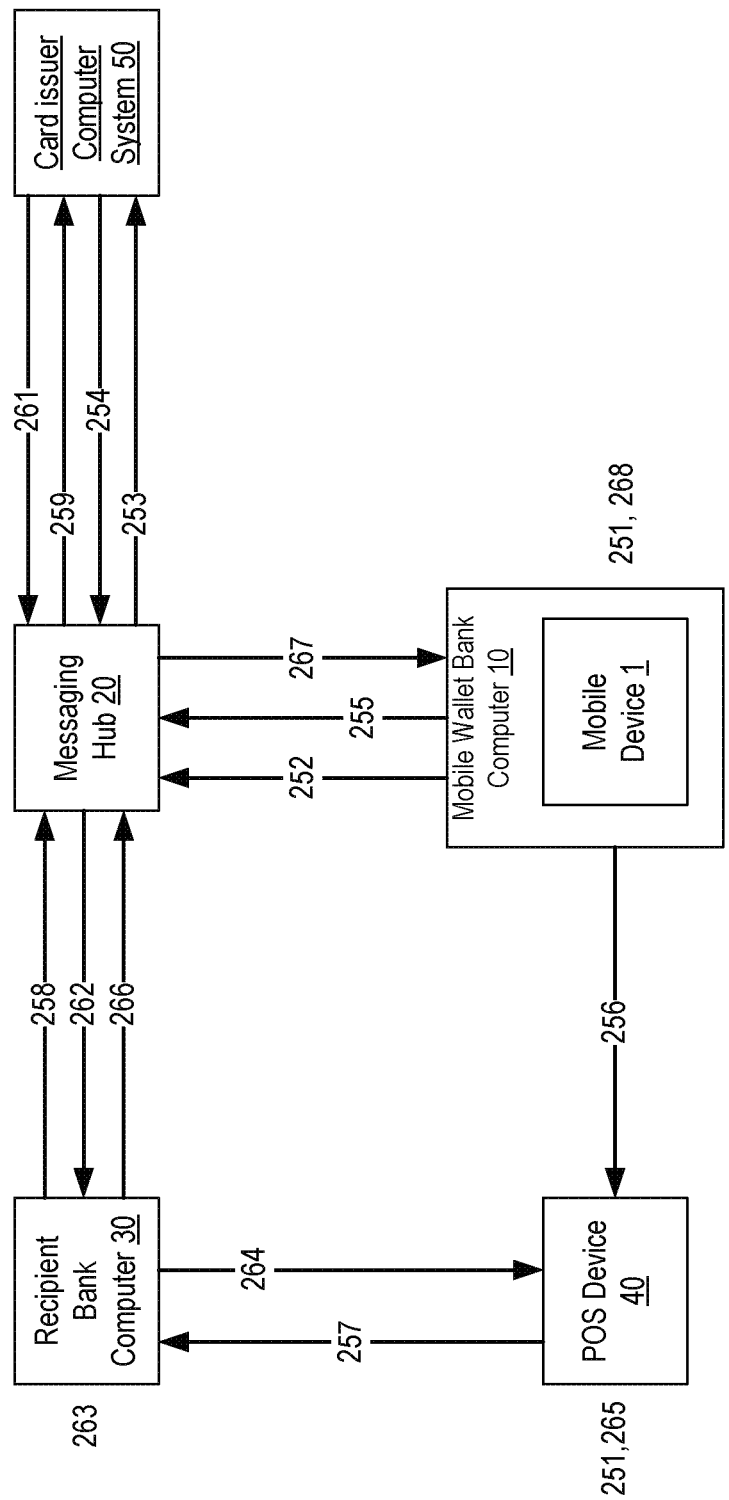
FIG. 2b is a process implemented by the payment processing system of FIG. 1.

Referring now to FIG. 2b, FIG. 2b is a process implemented by the payment processing system. In the embodiment shown in FIG. 2b, the credit card issuer bank is different than the mobile wallet application provider. In FIGS. 2b and 3b, for simplicity mobile device 1 and mobile wallet bank computer system 10 are shown as being combined, but it will be appreciated that they operate in a manner that is similar to FIGS. 2a, and 3a. Table 2 below describes the messages that are transmitted in various steps and the content of the messages. Table 2 refers to an alpha wallet that represents the mobile wallet bank computer 10 and the mobile device 1 from FIGS. 2b and 3b. The messaging hub that is referred to in Table 2 is the messaging hub computer system 20 from FIGS. 2b and 3b. The beta issuer that is referred to in Table 2 may operate or signify the card issuer computer system 50 from FIGS. 2b and 3b. The POS scanner referred to in Table 2 is shown in FIGS. 2b and 3b as POS device 40. The recipient bank computer 30 shown in FIGS. 2b and 3b is discussed in Table 2 as the gamma acquirer. However, the steps from FIG. 3b may use similar messages and routing as shown in FIG. 2b. Unlike FIG. 2b, the POS device 40 initiates the process of FIG. 3b. The steps shown in FIG. 3b transmit similar data as the step described for FIG. 2b.

TABLE 2

| Step number and Name | Step Description | Msg Routing Info (TO) | Msg Routing Info (FROM) | Payload |
|---|---|---|---|---|
| 251 - Customer requests a Dynamic Token (DT) | Consumer of Alpha Wallet or Alpha wallet makes a request for a Dynamic token using a previously provisioned Payment Identifier User selects Payment Identifier associated with the underlying payment method | Mobile wallet provider | Mobile device | WUI |
| 252 - Dynamic Token (DT) request sent to Messaging Hub (MH) | Alpha Wallet sends request for Dynamic Token to the Messaging Hub | II: Issuer Identifier | WUI: Wallet User Info WPI: Wallet Platform Info | PI: Payment Identifier |
| 253 - Dynamic Token (DT) request sent to Beta Issuer | Messaging Hub (MH) passes request for Dynamic Token (DT) to the appropriate Issuer. | II: Issuer Identifier | WUI: Wallet User Info WPI: Wallet Platform Info | PI: Payment Identifier |
| 254 - Beta issuer generates Dynamic Token and sends back to the MH (Messaging Hub) | Beta issuer generates a Dynamic Token in Track 1 or 2 format and sends it back to the MH (Messaging Hub) The Dynamic Token is in Track 1 or Track 2 format and includes issuer specific info, dynamic data and the last 4 digits of the underlying payment type | WUI: Wallet User Info WPI: Wallet Platform Info | II: Identifier Identifier | DT: Dynamic Token. |

TABLE 2-continued

| Step number and Name | Step Description | Msg Routing Info (TO) | Msg Routing Info (FROM) | Payload |
| --- | --- | --- | --- | --- |
| 255 - MH sends the Dynamic Token (DT) to the Alpha Wallet | MH sends the Dynamic Token (DT) to the Alpha Wallet. | WUI: Wallet User Info WPI: Wallet Platform Info | II: Issuer Identifier | DT: Dynamic Token |
| 256 - POS Scanner reads or accepts the DT | The Alpha Wallet will either display the Dynamic Token as a QR Code for scanning by the POS or transmit the Dynamic Token to the POS via other communication methods. Other communication methods may include NFC, Bluetooth, Hypersonic or other communication technologies | via scan | via scan | DT: Dynamic Token |
| 257 - POS sends final purchase amount and DT to Gamma Acquirer | Once the final purchase amount is calculated, the POS will send the Dynamic Token (Track 1 or 2 Data) to its existing acquirer/processor | II: Issuer Identifier as part of the DT Dynamic Token | MID: Merchant ID | DT: Dynamic Token |
| 258 - Gamma Acquirer sends DT to MH | The Gamma Acquirer reads the II as part of the Dynamic Token and sends the DT to the MH | II: Issuer Identifier as part of the DT Dynamic Token | AID: Acquirer ID MID: Merchant ID | DT: Dynamic Token |
| 259 - MH receives DT and routes to the Beta Issuer | The MH reads the II as part of the Dynamic Token, recognizes it as an II and sends the DT to the Beta Issuer. | II: Issuer Identifier as part of the DT Dynamic Token | AID: Acquirer ID MID: Merchant ID | DT: Dynamic Token |
| 260 - Beta Issuer confirms the DT's validity and retrieves the actual card number/underlying payment credential | Beta issuer matches the DT to the original PI that was associated with the DT and then determines the underlying payment credential | | | ACN/UPC: Actual Card Number/ Underlying Payment Credential |
| 261 - Beta Issuer sends the ACN/UPC to the MH | | AID: Acquirer ID MID: Merchant ID | II: Issuer Identifier | ACN/UPC: Actual Card Number/ Underlying Payment Credential Trace ID: A subset of the DT for the transaction that is used for issuer security and matching |
| 262 - MH Sends the ACN/UPC to the Gamma Acquirer along with a Trace ID. | MH looks at the AID associated with the message and sends the ACN/UPC to the appropriate acquirer. | AID: Acquirer ID MID: Merchant ID | II: Issuer Identifier | ACN/UPC: Actual Card Number/ Underlying Payment Credential Trace ID: A subset of the DT for the transaction that is used for issuer security and matching |

TABLE 2-continued

| Step number and Name | Step Description | Msg Routing Info (TO) | Msg Routing Info (FROM) | Payload |
|---|---|---|---|---|
| 263 - Gamma Acquirer processes payment using the ACN/UPC | Gamma Acquirer processes payment using the ACN/UPC via its existing process and includes the Trace ID for issuer matching and security. This results in authorization and settlement | | | ACN/UPC: Actual Card Number/ Underlying Payment Credential |
| 264 - Gamma Acquirer sends Approval/Decline to the POS | Existing process | | | Approve/Decline |
| 265 - POS prints receipt as normal | Existing process | | | Approve/Decline |
| 266 - Gamma Acquirer sends Approval/Decline to MH | Gamma Acquirer sends Approval/Decline to MH based upon the II | II: Issuer Identifier | AID: Acquirer ID MID: Merchant ID | Approve/Decline |
| 267 - MH sends Approval/Decline to the Alpha Wallet | MH sends Approval/Decline to the Alpha Wallet based upon the II | II: Issuer Identifier | AID: Acquirer ID MID: Merchant ID | Approve/Decline |
| 268 - Alpha Wallets sends an email and push notification to the Alpha Wallet User | Alpha Wallets sends an email and push notification to the Alpha Wallet User | | | |

Figure 3A:
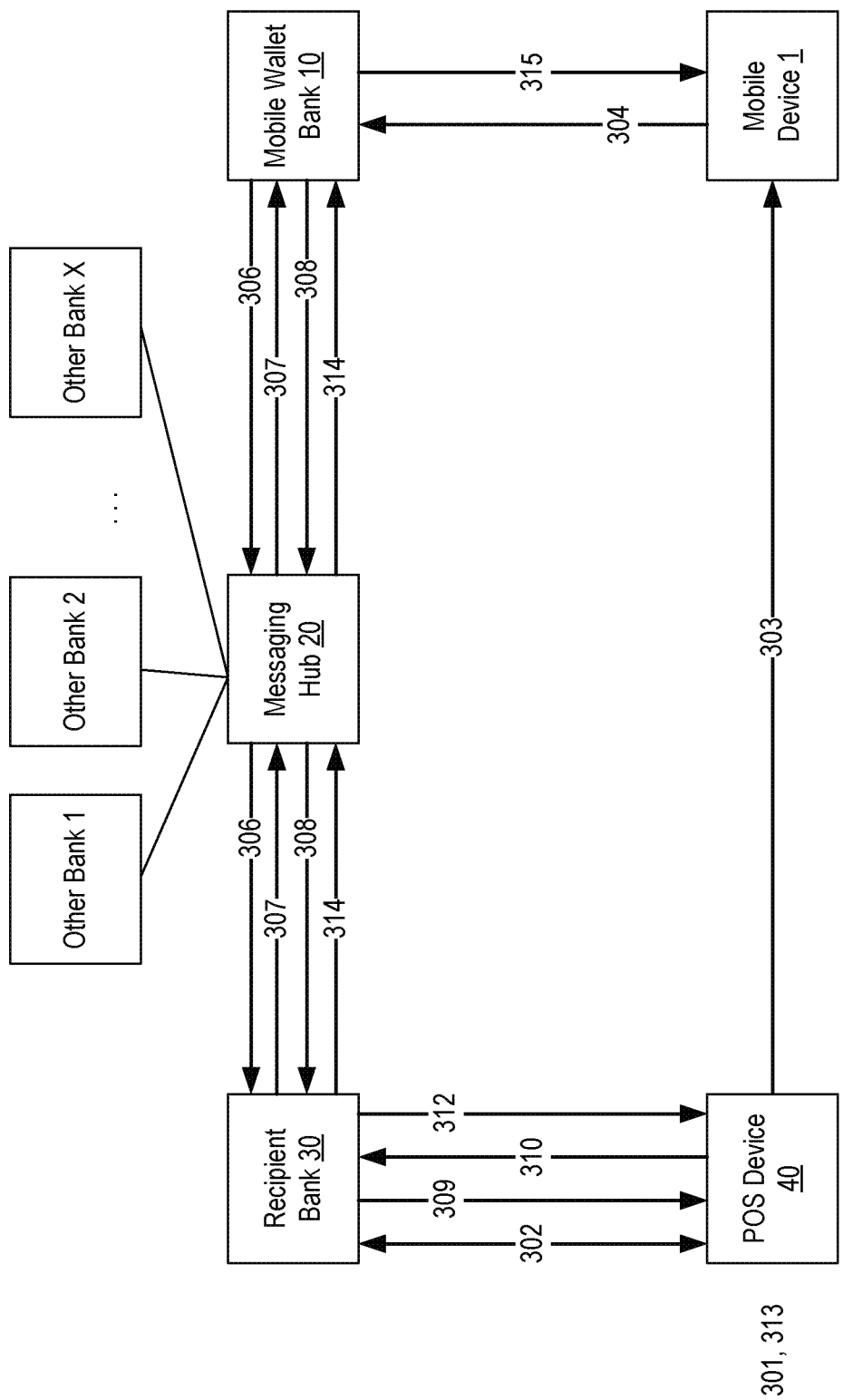
FIG. 3a is a process implemented by the payment processing system of FIG. 1.
Figure 3B:
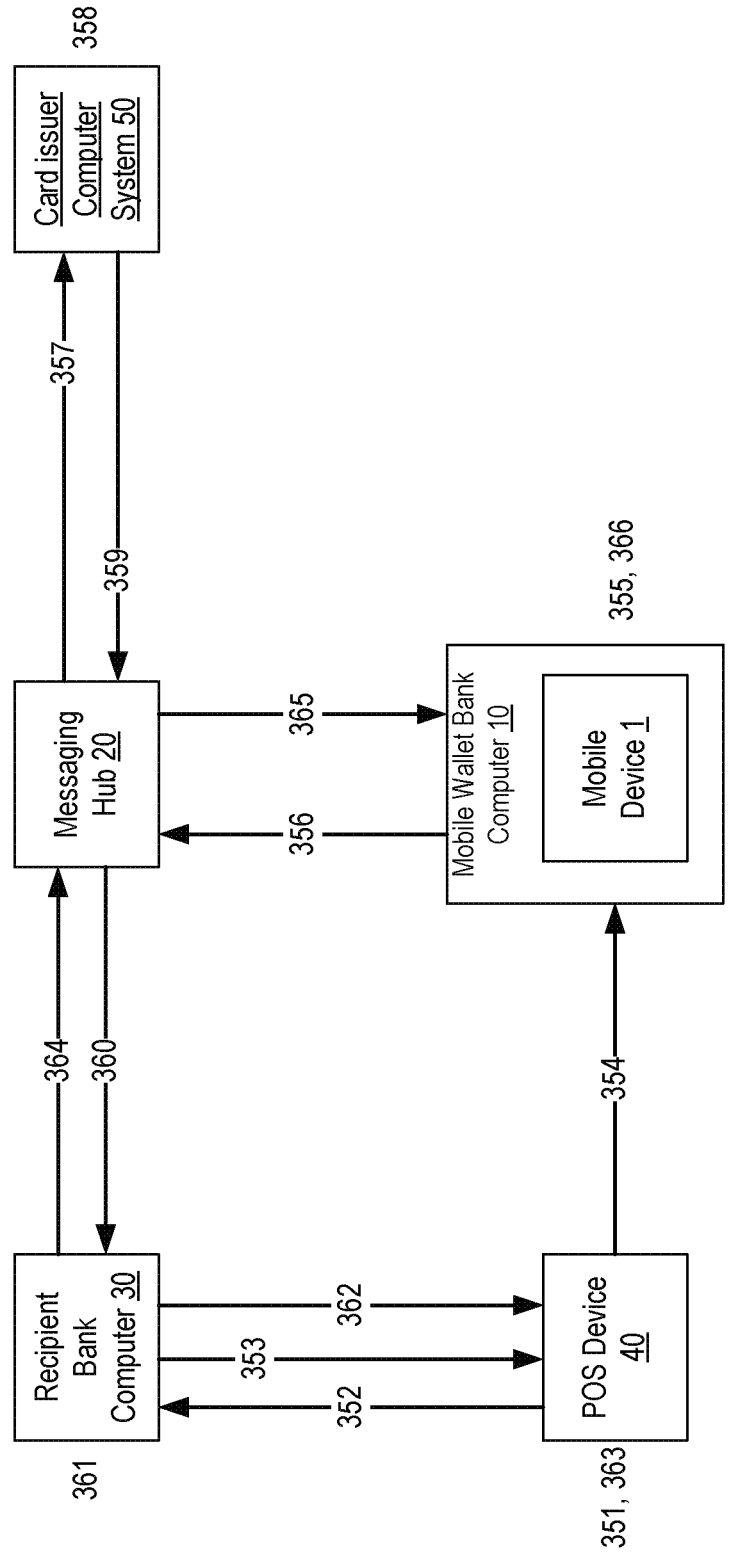
FIG. 3b is a process implemented by the payment processing system of FIG. 1.

Referring now to FIG. 3a, FIG. 3a is a process implemented by the payment processing system. In the embodiment of FIG. 3a, a code (DT) is generated and displayed by the POS device 40 and optically scanned by the mobile device 1. Such an arrangement avoids the need for the POS device 40 to include a scanner.

Specifically, in the embodiment shown in FIG. 3a, at step 301, the user may select using a mobile device 1 as a payment option at the POS device 40. Upon receiving the user input, the POS device 40 sends a request to the recipient bank system 30, specifically, a request for a numerical code (DT), a QR code or other code as described herein. In response, at step 302, the recipient bank system 30 creates the code (e.g. numerical, barcode, or QR code, etc.). The recipient bank system 30 may send the code to POS device 40 for display on POS terminal screen or printed on a receipt. At step 303, the mobile device 1 may receive the code by using a camera. A user may access the mobile wallet application in the mobile device 1 and request that a payment be made. Upon scanning or taking a picture of the code that is displayed on the POS device 40 at step 303, the mobile device 1 may transmit the code to the mobile wallet bank 10 at step 304. Next, at step 305, the mobile wallet bank computer system 10 sends the code to the messaging hub computer system 20. The code may identify the merchant using merchant identifier and merchant registry information (MM). The messaging hub computer system 20, at step 306, sends the code to the recipient bank system 30. At step 307, the recipient bank system 30 determines the validity of the code and also determines the whether the codes is expired, not previously used, etc. The recipient bank system 30 accesses the database and determines the merchant identification for the (POS ID and/or MID) POS device 40. The merchant identification is transmitted from the recipient bank system 30 to the messaging hub computer system 20 and the messaging hub computer system 20 transmits the merchant identification to the mobile wallet bank computer system 10. The mobile wallet bank computer system 10 receives the merchant identification and the transaction code.

At step 308, the mobile wallet bank computer system 10 sends the payment information regarding user payment account and any stored merchant loyalty information to the recipient bank system 30 through the messaging hub computer system 20. Next, at step 309, the recipient bank system 30 may transmit the loyalty information to the POS device 40 to be displayed for the user. Next, at step 310, based on the loyalty information, the final transaction amount is determined by the POS device 40 and transmitted to the recipient bank computer system 40. The recipient bank system 30 receives the transaction amount and processes the transaction using the payment information that the recipient bank system 30 received from the mobile wallet bank computer system 10, at step 311. The recipient bank system 30 also determines whether the transaction is approved or denied.

At step 312, the approval or denial is transmitted to the POS device 40. Next, at step 313, the POS device 40 prints a receipt or sends a receipt to the user. Next, at step 314, the recipient bank system 30 sends an approval and/or decline message to the mobile wallet bank 10 via a messaging hub computer system 20. The mobile wallet bank system 10 transmits a notification to the mobile device 110 to inform the mobile device 110 regarding the approval or decline decisions at step 315.

Referring now to FIG. 3b, FIG. 3b is a process implemented by the payment processing system. Table 2 above describes the messages that are transmitted in various steps and the content of the messages. Table 2 refers to the steps from FIG. 2a. However, the steps from FIG. 3b may use similar messages and routing as shown in FIG. 2a. FIG. 3b illustrates a process implemented by the payment processing system of FIG. 1. In the embodiment shown in FIG. 3b, the credit card issuer bank is a separate entity than the mobile wallet application provider. Table 4 below describes the messages that are transmitted in various steps and the content of the messages. The process of FIG. 7 is initiated by the POS device 40 by initiating the transaction request for the code. The steps shown in FIG. 7 transmit similar data as the step described for FIG. 6.

Figure 4:
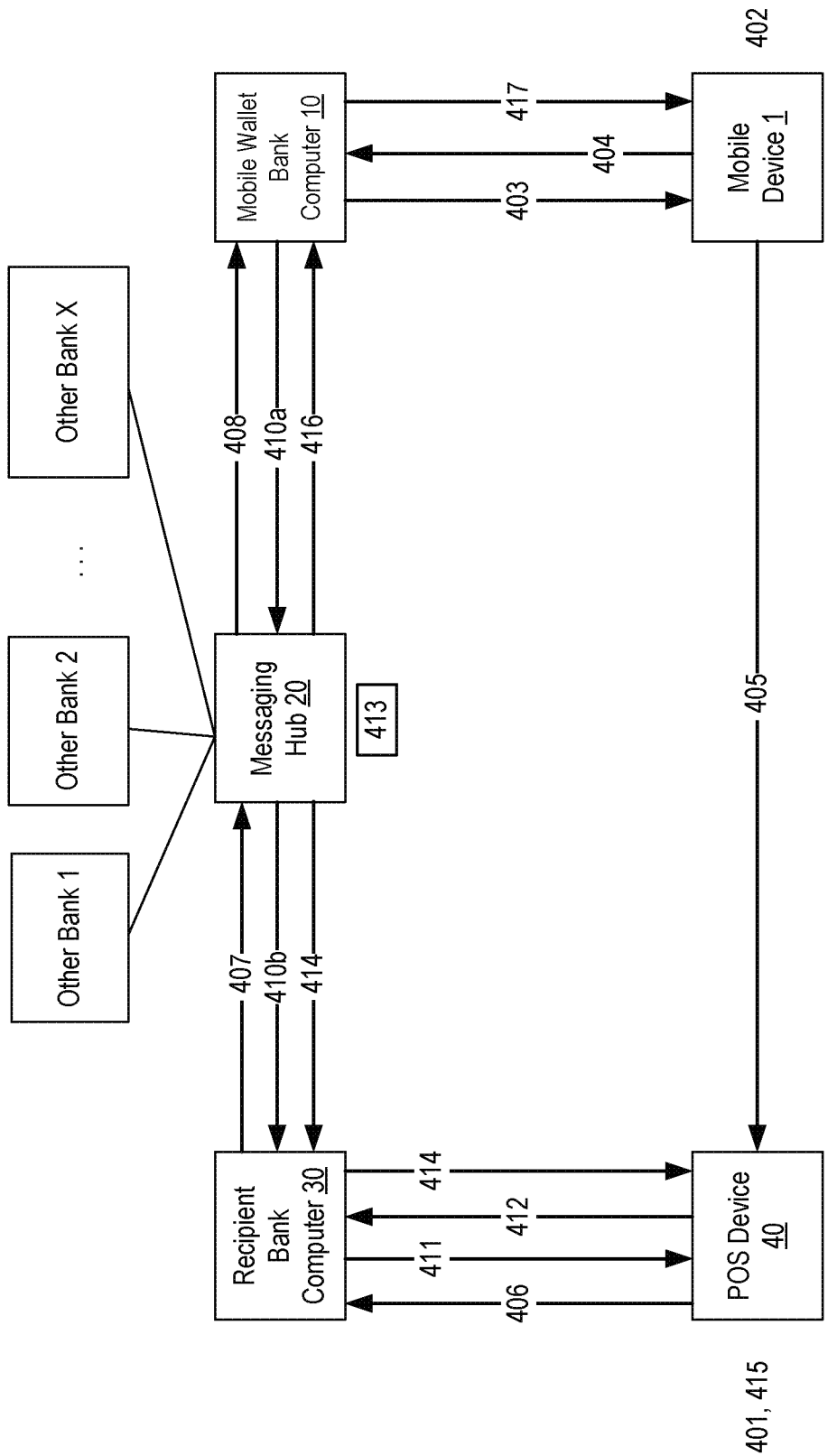
FIG. 4 is a process implemented by the payment processing system of FIG. 1.
Figure 5:
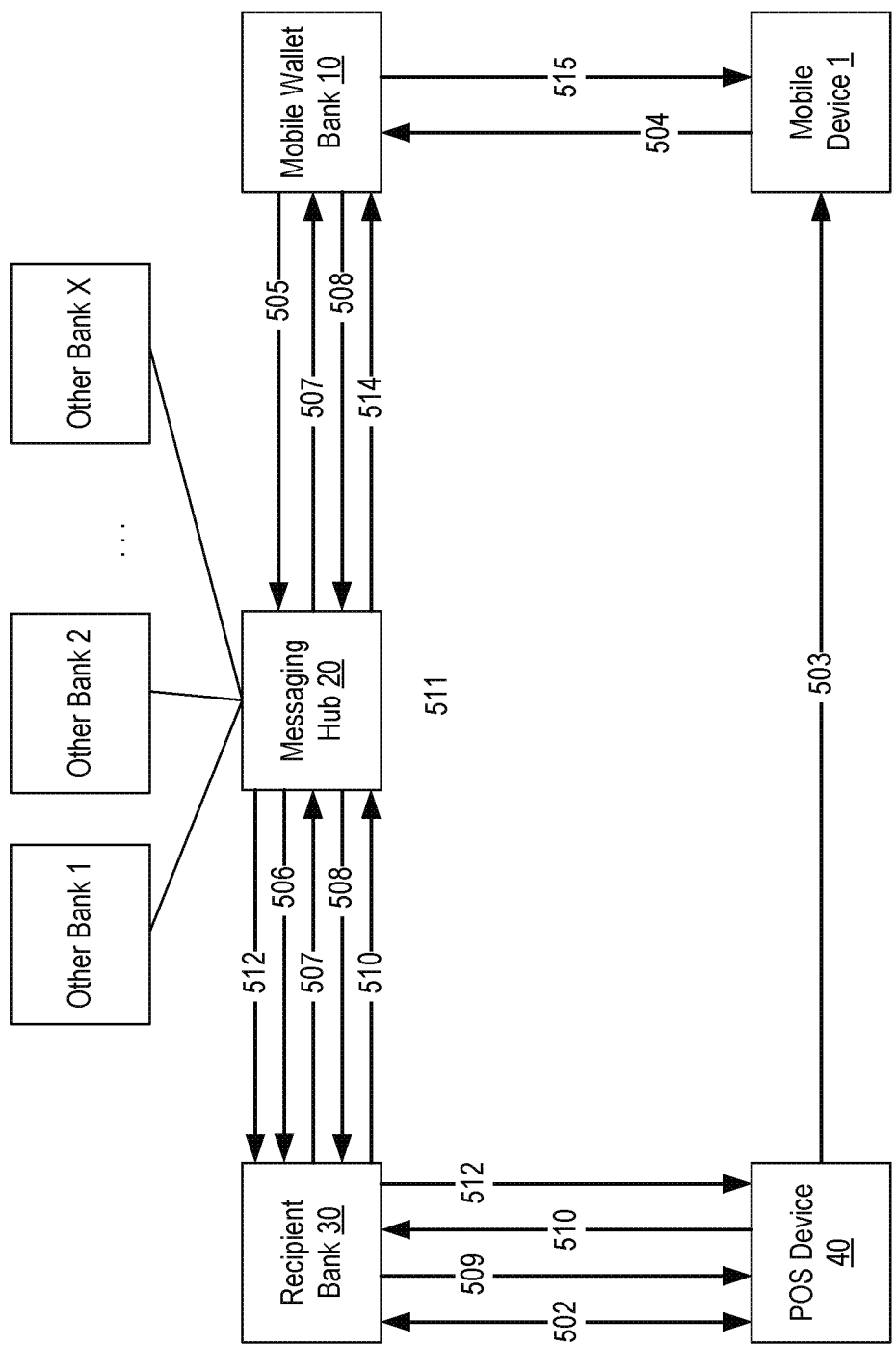
FIG. 5 is a process implemented by the payment processing system of FIG. 1.

In the embodiments of FIGS. 2a, 2b, 3a and 3b, the recipient bank system 30 receives the credit card number of the user, submits the credit card transaction for approval, and the credit card transaction is processed as a standard four party credit card transaction between a customer, a merchant, an issuing bank and an acquiring bank. The messaging hub computer system 20 operates to communicate information between the mobile wallet bank computer system 10 and the recipient bank computer system 30. Referring now to FIGS. 4 and 5, in other embodiments, a demand deposit account is used as a source of funds and the messaging hub computer system 20 may facilitate processing of the transaction by transmitting information about demand deposit accounts held by the sender and the recipient.

A demand deposit account is an account in which deposits can be "demanded" by an account holder at any time. Funds in a demand deposit account can be withdrawn at any time without any advance notice to the depository or financial institution. For example, many checking and savings accounts are demand deposits and are accessible by the account holder through a variety of banking options, including teller, ATM and online banking. In contrast, a term deposit is a type of account that cannot be accessed for a predetermined period (typically the loan's term). Demand deposit accounts may have features such as no maturity period (or an original maturity of fewer than seven days), payable on demand, may be interest bearing, no limit on the number of withdrawals or transfers an account holder may make, and no eligibility requirements. In some types of transactions using demand deposit accounts, various entities may charge fees, to the user, the merchant or the bank, in order to use the funds in a demand deposit account at a point of sale location. For example, when the user uses a debit card to access their funds, the user may be charged a debit card fee by the bank. In another example, when the user uses a debit card through an open loop payment processor, the merchant and/or the bank may be charged a fee in connection with the transaction. Systems and methods described herein may in some cases reduce the fees charged to the user, the merchant or the bank.

Referring first to FIG. 4, FIG. 4 illustrates another method for completing a transaction that is implemented by the payment processing system of FIG. 1. For purposes of providing an example, it is assumed that the two parties to the transaction in FIG. 4 are a user of mobile wallet application 6 (e.g., consumer) and a merchant. In some embodiments, the merchant may also be using a mobile wallet application that is the same or similar to the mobile wallet application that is being used by the consumer. As mentioned above, it will be appreciated that other types of transactions may be possible.

At step 401, the user may provide input to the POS device 401. For example, a user purchasing merchandise at a merchant location may be at a checkout counter or other type of POS arrangement. The user may be presented with a series of payment options at the POS device 40 (e.g., credit card, debit card, mobile device, and so on). The user then selects a payment type (here, "mobile") to pay for goods or services, and the POS 40 receives the selection of the payment option.

Next, at step 402, the user may access the mobile wallet application 6 on the mobile device 1 and select a "pay now" or similar option on the mobile device. As previously discussed, the mobile wallet application 6 may also offer the user various payment types (e.g., various credit cards, debit cards, alternative payment type, demand deposit account, bank account, money market account and so on). The user may have pre-specified a default payment type that may be used prior to the transaction being initiated by the POS device 40 or the user reaching the POS device 40. A profile may be stored on the mobile device 1 or the mobile wallet bank computer system 10. The profile may store a priority of payment types, for example, in the most preferred to the least preferred option. In some embodiments, the payment option chosen by the user may be a demand deposit account that is provided by a financial institution. In an example embodiment, the mobile wallet bank may provide the demand deposit account. In another example embodiment, another financial institution (e.g. other bank 1, other bank 2, etc.) provides the demand deposit account. In some embodiments, the mobile wallet bank may store identification information for the demand deposit account, such as but not limited to, the routing number, bank account number and other account identification information. The mobile device 1 may receive the user input and initiate communication with the mobile wallet bank computer system 10.

At step 403, the mobile device 1 may send a request to the mobile wallet bank computer system 10 for a code that may be used to identify the transaction that will occur between the user and the owner of the POS device 40. The message that is transmitted may include information identifying the user (e.g., a device identifier for the mobile device 1, a unique identifier associated with the mobile wallet application 6 when installed by the user, etc.). Information regarding the payment type selected by the user may also be sent. The mobile wallet bank computer system 10 may be configured to receive requests directly from the mobile device 1 for codes and/or other information.

At step 404, the mobile wallet bank computer system 10 may generate a random code or sequential code as described above, e.g., in connection with FIG. 1. In one embodiment, the code may represent a unique identifier for the transaction that is about to be completed between the user and the merchant. In other embodiments, the code may also include a transaction identifier and verification codes that identify the mobile wallet bank computer system 10 to the messaging hub computer system 20 when the code is received by the messaging hub computer system 20. In some embodiments, the mobile wallet bank computer system 10 may generate a code based on a standard that the messaging hub computer system 20 can decode and determine which entity to communicate with next. In some embodiments, the code may represent a coded version of the demand deposit account information (i.e. routing number and account number) that may be decoded by the messaging hub computer system 20 using a key that is embedded within a decodable version of the code.

After receiving the code from the mobile wallet bank computer system 10, the mobile device 1 may process the code using the code processing system 7. In one embodiment, the code may be sent over a wired or wireless link between the mobile device 1 and the mobile wallet bank computer system 10. In one embodiment, to reduce bandwidth requirements and transmission times, the code may be sent as a numeric code and transformed into a QR code for display purposes. In such an embodiment, the code processing system 7 may be configured to convert the code into a displayable image that may be scanned by the POS device 40. In other embodiments, the code may be sent as an image (e.g., QR code or bar code). At step 405, the mobile device 1 may generate a display and the POS device 40 may optically scan the displayed code.

At step 406, after scanning the code from the mobile device 1, the code and a merchant identification number from the POS device 40 is transmitted to the recipient bank computer system 30. At step 407, after receiving the code, the recipient bank computer system 30 may be configured to transmit the code and the merchant identification number to the messaging hub computer system 20. Upon receiving the code, the messaging hub computer system 20 may perform an initial validation of the code and then decode it to determine the banking institution with which it is associated (i.e., to determine which banking institution generated the code). In some embodiments, the code or a portion of the code may be matched with a number that identifies the banking institution (e.g., the last three or four digits may be used to access a lookup table).

Next, at step 408, the code and the merchant identification number is sent to the mobile wallet bank computer system 10. At step 409, the mobile wallet bank computer system 10 confirms the code's validity. Details of the code may be compared against codes that were previously generated by the mobile wallet bank computer system 10 (in this example, the code is the same as the code that was generated in step 404). Additionally, the mobile wallet bank computer system 10 may confirm that the code has not expired. For example, the code that was originally generated at step 404 may expire within a predetermined period of time, such as, 15 minutes, 10 minutes, 5 minutes, 3 minutes or another period of time. The mobile wallet bank computer system 10 maintains a record of the time when each code was generated. When the mobile wallet bank computer system 10 receives the code from the messaging hub computer system 20 or another entity, the mobile wallet bank computer system 10 compares the time the code was generated and the time when the code was received from the messaging hub computer system 20. In some embodiments, the mobile wallet bank computer system 10 provides the time the code was generated to the messaging hub computer system 20 and the messaging hub computer system 20 may perform the time comparison. Also, the mobile wallet bank computer system 10 may confirm that the code has not already been used for another transaction.

At step 410a, upon verifying the validity of the code, the mobile wallet bank computer system 10 transmits the payment information (e.g. account information) to the messaging hub computer system 20. The payment information may include the routing number and the account number for the demand deposit account to be used for the transaction. Additionally, the mobile wallet bank computer system 10 may send stored merchant loyalty information to the messaging hub computer system 20. In some embodiments, the user account and loyalty information is stored in a database maintained at the messaging hub computer system 20, and the mobile wallet computer system 10 is not accessed by the messaging hub computer system 20 for this information. At step 410b, the messaging hub computer system 20 may transmit the payment information and the loyalty information to the recipient bank computer system 30.

Next, at step 411, the recipient bank system 30 transmits the loyalty information to the POS device 40. At step 412, the POS device 40 uses the loyalty information to calculate the final transaction amount and transmits the transaction amount to the recipient bank computer system 40. At step 413, upon receiving the transaction amount, the messaging hub computer system 20 triggers the transaction to occur between the user identified or chosen demand deposit account and the recipient bank computer system 30 (e.g., merchant demand deposit account). The messaging hub computer system 20 may receive the purchase amount and the registry information for both the user demand deposit account and the recipient's bank account. The messaging hub computer system 20 may transfer funds from the demand deposit account to the recipient bank account. In another embodiment, the recipient bank system 30 processes the transaction using the payment information received from the messaging hub computer system 20. For example, when the demand deposit account information is received, the recipient bank system 30 may submit the transaction for approval to the ACH processing system to process the transaction between a customer, a merchant, an issuing bank and an acquiring bank.

Next, at step 414, the messaging hub computer system 20 provides an indication whether the transaction is approved or declined to the POS device 40 via recipient bank computer system 30. Next, at step 415, the POS device 40 prints a receipt for the user. As another example, the user may choose via the mobile wallet application 6 to have the receipt sent electronically to the mobile device 1 via the messaging hub computer system 20.

Next, at step 416, the messaging hub computer system 20 sends an indication whether the transaction is approved or declined to the mobile wallet bank computer system 10. At step 417, the mobile wallet bank computer system 10 sends a notification to the mobile wallet application 6. Based on this information, a message may be displayed to the user via the mobile device 1 at the point of sale indicating whether the transaction was approved or declined.

In various embodiments, each message that is transmitted for steps 401 to 417 includes the code to identify the transaction. The banks computer systems 10 and 30 and the messaging hub computer system 20 may receive the sensitive account information (e.g., demand deposit account information) during the various steps discussed herein, however, the POS device 40 or the mobile device 1 need not receive the user's account information. Hence, account security may be enhanced. The messaging hub computer system 20 facilitates a secure transmission of sensitive information and aids the banks by providing a single point of contact. Moreover, the messaging hub computer system 20 creates a messaging format that each banking entity must comply with for transmitting messages.

In the embodiment of FIG. 4, a code is generated on the display of the mobile device 1 and the code is displayed for optical scanning by the POS device 40. Hence, the user presents the mobile device for scanning at the time of sale, creating a user experience for the user that is somewhat similar to presentation of a credit card.

Referring now to FIG. 5, FIG. 5 is a process implemented by the payment processing system 100. In the embodiment of FIG. 5, a code is generated and displayed by the POS device 40 and optically scanned by the mobile device 1. Such an arrangement avoids the need for the POS device 40 to include a scanner.

Specifically, in the embodiment shown in FIG. 5, at step 501, the user may select using a mobile device 1 as a payment option at the POS device 40. Upon receiving the user input, the POS device 40 sends a request to the recipient bank system 30, specifically, a request for a numerical code, a QR code, an RFID code, a near field communication code or other code as described herein. In response, at step 502, the recipient bank system 30 creates the code (e.g. numerical, barcode, or QR code, etc.). The recipient bank system 30 may send the code to POS device 40 for display on POS terminal screen or printed on a receipt. At step 503, the mobile device 1 may receive the code by using a camera. A user may access the mobile wallet application in the mobile device 1 and request that a payment is made. Upon scanning or taking a picture of the code that is displayed on the POS device 40 at step 503, the mobile device 1 may transmit the code to the mobile wallet bank 10 at step 504. Next, at step 505, the mobile wallet bank computer system 10 sends the code to the messaging hub computer system 20. The messaging hub computer system 20, at step 506, sends the code to the recipient bank system 30. At step 507, the recipient bank system 30 determines the validity of the code and also determines the whether the codes is expired, not previously used, etc. The recipient bank system 30 accesses the database and determines the merchant identification for the POS device 40. The merchant identification is transmitted from the recipient bank system 30 to the messaging hub computer system 20 and the messaging hub computer system 20 transmits the merchant identification to the mobile wallet bank computer system 10. The mobile wallet bank computer system 10 receives the merchant identification and the transaction code.

At step 508, the mobile wallet bank computer system 10 sends the payment information regarding user demand deposit account and any stored merchant loyalty information to the messaging hub computer system 20. Next, at step 509, the recipient bank system 30 may transmit the loyalty information to the POS device 40 to be displayed for the user. Next, at step 510, based on the loyalty information, the final transaction amount is determined by the POS device 40 and transmitted to the recipient bank computer system 40. The POS device 40 and the recipient bank computer system 40 may transmit the final transaction amount to the messaging hub computer system 20, at step 510. The messaging hub computer system 20 may process the transaction between the user identified demand deposit account and the merchant demand deposit account after receiving the transaction amount, at step 511. In some embodiments, the messaging hub computer system 20 may receive the funds equaling the transaction amount from the demand deposit account of the user. Next at step 511, the received funds may be transferred to the recipient bank demand deposit account. In another embodiment, the funds may be transferred using an ACH process to the demand deposit account held by the recipient.

At step 512, the messaging hub computer system 20 sends the approval or denial is transmitted to the POS device 40. Next, at step 513, the POS device 40 prints a receipt or sends a receipt to the user. Next, at step 514, the recipient bank system 30 sends an approval and/or decline message to the mobile wallet bank 10 via a messaging hub computer system 20. The mobile wallet bank system 10 transmits a notification to inform the mobile device 1 regarding the approval or denial decisions at step 515.

Figure 6:
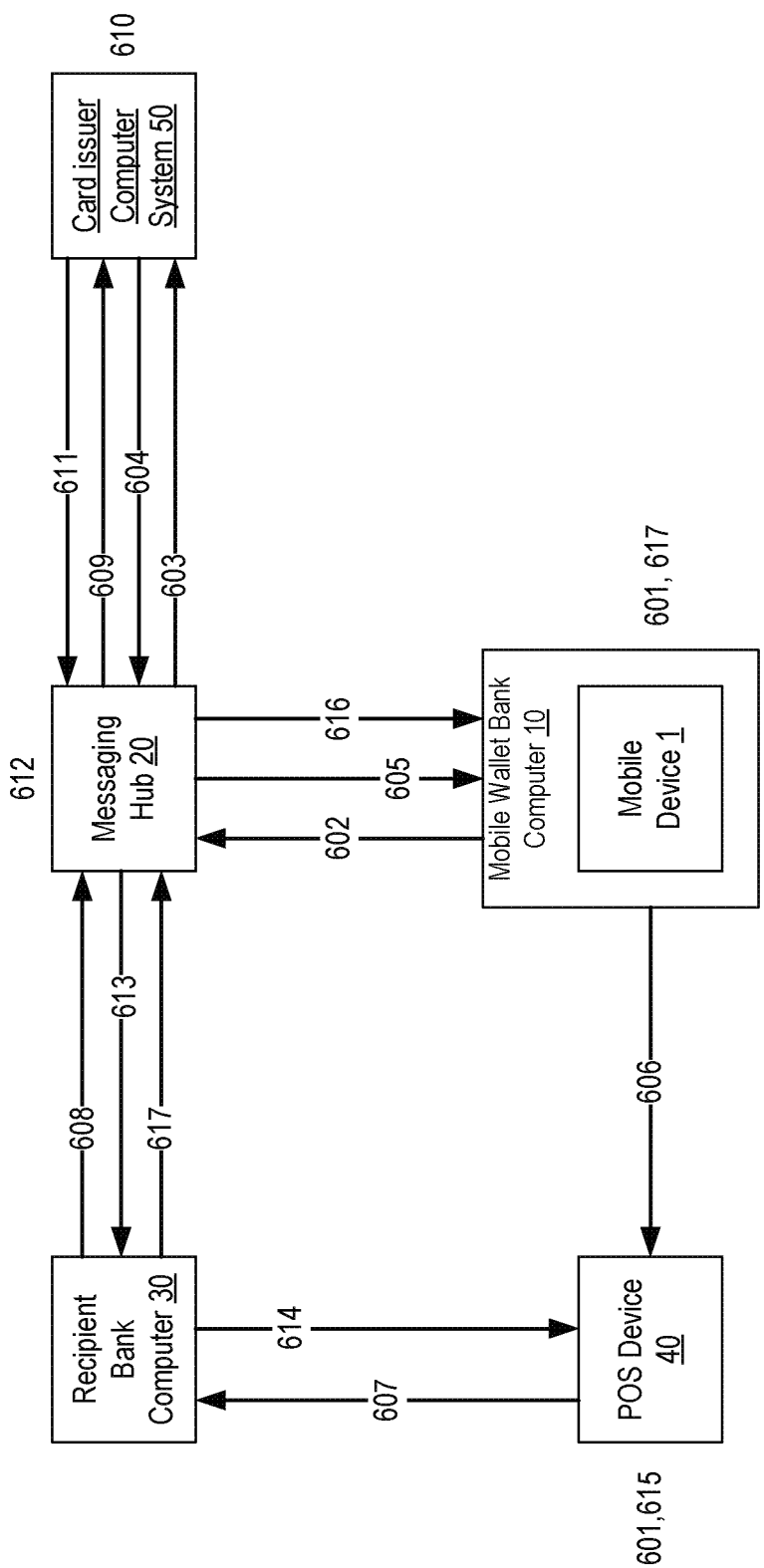
FIG. 6 is a process implemented by the payment processing system of FIG. 1.
Figure 7:
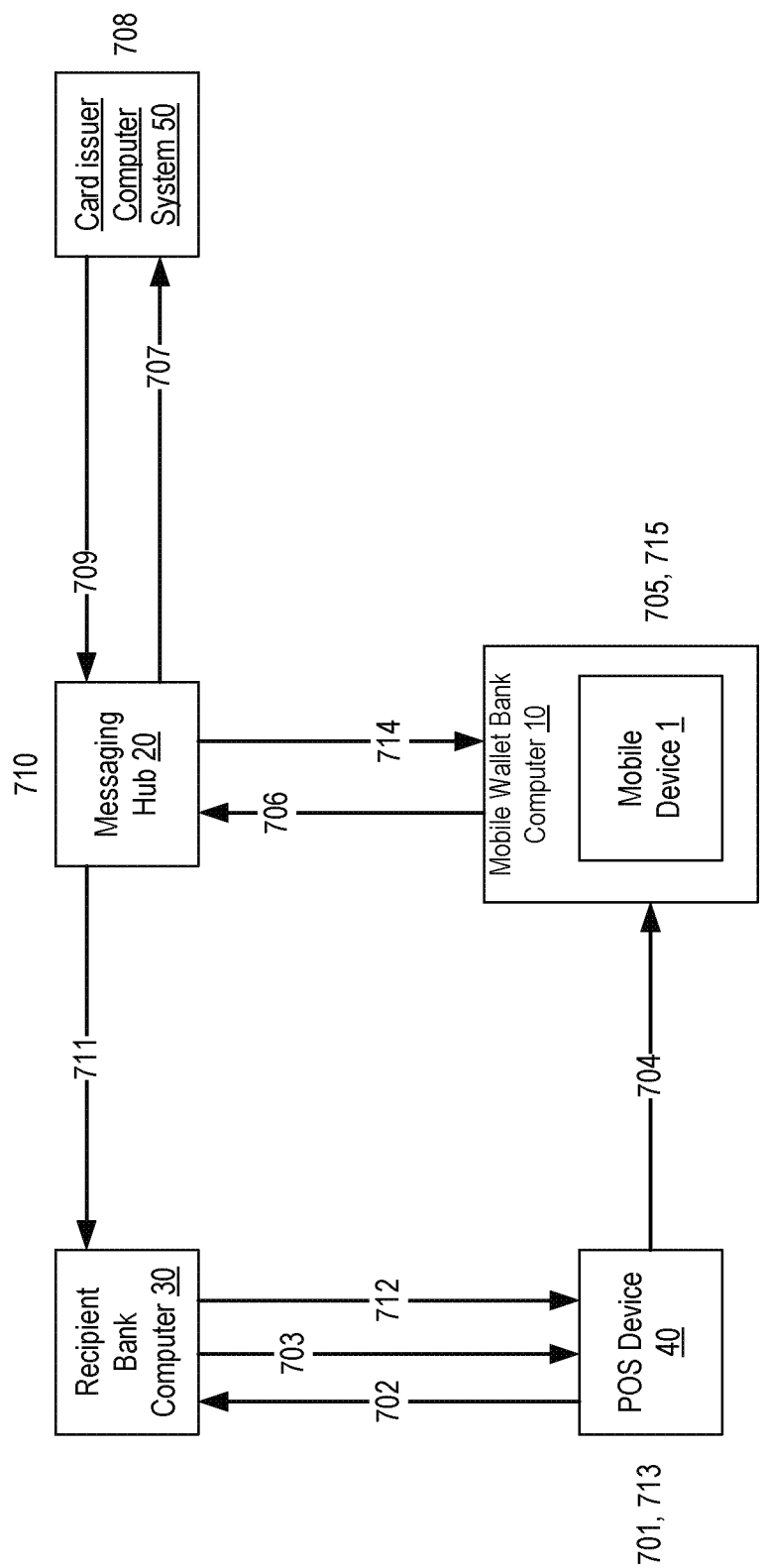
FIG. 7 is a process implemented by the payment processing system of FIG. 1.

FIG. 6 illustrates a process implemented by the payment processing system of FIG. 1. In the embodiment shown in FIG. 6, the credit card issuer bank is different than the mobile wallet application provider. In FIGS. 6 and 7, for simplicity mobile device 1 and mobile wallet bank computer system 10 are shown as being combined, but it will be appreciated that they operate in a manner that is similar to FIGS. 4, and 5. Table 3 below describes the messages that are transmitted in various steps and the content of the messages from FIG. 6. FIG. 7 illustrates a process implemented by the payment processing system of FIG. 1. Table 3 refers to the steps from FIG. 6. However, the steps from FIG. 7 may use similar messages and routing as shown in FIG. 6. In the embodiment shown in FIGS. 6 and 7, the credit card issuer bank is a separate entity than the mobile wallet application provider. Unlike FIG. 6, the POS device 40 initiates the process of FIG. 7. The steps shown in FIG. 7 transmit similar data as the step described for FIG. 6. Table 3 refers to an alpha wallet that represents the mobile wallet bank computer 10 and the mobile device 1 from FIGS. 6 and 7. The messaging hub that is referred to in Table 3 has the messaging hub computer system 20 from FIGS. 6 and 7. The beta issuer that is referred to in Table 3 may operate or signify the card issuer computer system 50 from FIGS. 6 and 7. The POS scanner referred to in Table 3 is shown in FIGS. 6 and 7 as POS device 40. The recipient bank computer 30 shown in FIGS. 6 and 7 is discussed in Table 3 as the gamma acquirer.

TABLE 3

| Step number - Step Name | Step Description | Msg Routing Info (TO) | Msg Routing Info (FROM) | Payload |
|---|---|---|---|---|
| 601 - Customer requests a Dynamic Token (DT) | Consumer of Alpha Wallet or Alpha wallet makes a request for a Dynamic token using a previously provisioned Payment Identifier. User selects Payment Identifier associated with the underlying payment method. | | | |

TABLE 3-continued

| Step number - Step Name | Step Description | Msg Routing Info (TO) | Msg Routing Info (FROM) | Payload |
|---|---|---|---|---|
| 602 - Dynamic Token (DT) request sent to Messaging Hub (MH) | Alpha Wallet sends request for Dynamic Token to the Messaging Hub | II: Issuer Identifier | WUI: Wallet User Info WPI: Wallet Platform Info | PI: Payment Identifier |
| 603 - Dynamic Token (DT) request sent to Beta Issuer | Messaging Hub (MH) passes request for Dynamic Token (DT) to the appropriate Issuer. | II: Issuer Identifier | WUI: Wallet User Info WPI: Wallet Platform Info | PI: Payment Identifier |
| 604 - Beta issuer generates Dynamic Token and sends back to the MH (Messaging Hub) | Beta issuer generates a Dynamic Token in Track 1 or 2 format and sends it back to the MH (Messaging Hub) The Dynamic Token is in Track 1 or Track 2 format and includes issuer specific info, dynamic data and the last 4 digits of the underlying payment type. | WUI: Wallet User Info WPI: Wallet Platform Info | II: Issuer Identifier | DT: Dynamic Token. |
| 605 - MH sends the Dynamic Token (DT) to the Alpha Wallet | MH sends the Dynamic Token (DT) to the Alpha Wallet. | WUI: Wallet User Info WPI: Wallet Platform Info | II: Issuer Identifier | DT: Dynamic Token |
| 606 - POS Scanner reads or accepts the DT | The Alpha Wallet will either display the Dynamic Token as a QR Code for scanning by the POS or transmit the Dynamic Token to the POS via other communication methods. Other communication methods may include NFC, Bluetooth, Hypersonic or other communication technologies | via scan | via scan | DT: Dynamic Token |
| 607 - POS sends final purchase amount and DT to Gamma Acquirer | Once the final purchase amount is calculated, the POS will send the Dynamic Token (Track 1 or 2 Data) to its existing acquirer/processor | II: Issuer Identifier as part of the DT Dynamic Token | MID: Merchant ID | DT: Dynamic Token |
| 608 - Gamma Acquirer sends Identifier as DT to MH | The Gamma Acquirer reads the II as part of the Dynamic Token and sends the DT to the MH | II: Issuer Identifier as part of the DT Dynamic Token | AID: Acquirer ID MID: Merchant ID MRI: Merchant Registry Info | DT: Dynamic Token |
| 609 - MH receives DT and routes to the Beta Issuer | The MH reads the II as part of the Dynamic Token, recognizes it as an II and sends the DT to the Beta Issuer. | II: Issuer Identifier as part of the DT Dynamic Token | AID: Acquirer ID MID: Merchant ID | DT: Dynamic Token |

TABLE 3-continued

| Step number - Step Name | Step Description | Msg Routing Info (TO) | Msg Routing Info (FROM) | Payload |
|---|---|---|---|---|
| 610 - Beta Issuer confirms the DT's validity and retrieves the Consumer's Registry Info | Beta issuer matches the DT to the original PI that was associated with the DT and then identifies the Consumer's Registry Info | | | CRI: Consumer's Registry Info |
| 611 - Beta Issuer sends the Consumer's Registry Info to the MH | | AID: Acquirer ID MID: Merchant ID | II: Issuer Identifier | CRI: Consumer's Registry Info |
| 612 - MH triggers money movement | MH triggers money movement from the Consumer's DDA to the Merchant's DDA upon knowing the Final Purchase Amount, the CRI and the MRI. This is where the money movement occurs. | | | |
| 613 - MH sends Approval/Decline to Gamma Acquirer | MH sends Approval/Decline to Gamma Acquirer based upon the AID/MID. This results in authorization and settlement. | II AID: Acquirer ID MID: Merchant ID | MH | Approve/Decline |
| 614 - Gamma Acquirer sends Approval/Decline to the POS | Gamma Acquirer sends Approval/Decline to the POS based upon the MID | MID: Merchant ID | MH | Approve/Decline |
| 615 - POS prints receipt | | | | Approve/Decline |
| 616 - MH sends Approval/Decline to Alpha Wallet | MH sends Approval/Decline to Alpha Wallet based upon WUI and WPI | WUI: Wallet User Info WPI: Wallet Platform Info | MH | Approve/Decline |
| 617 - Alpha Wallets sends an email and push notification to the Alpha Wallet User | Alpha Wallets sends an email and push notification to the Alpha Wallet User | | | |

Figure 8:
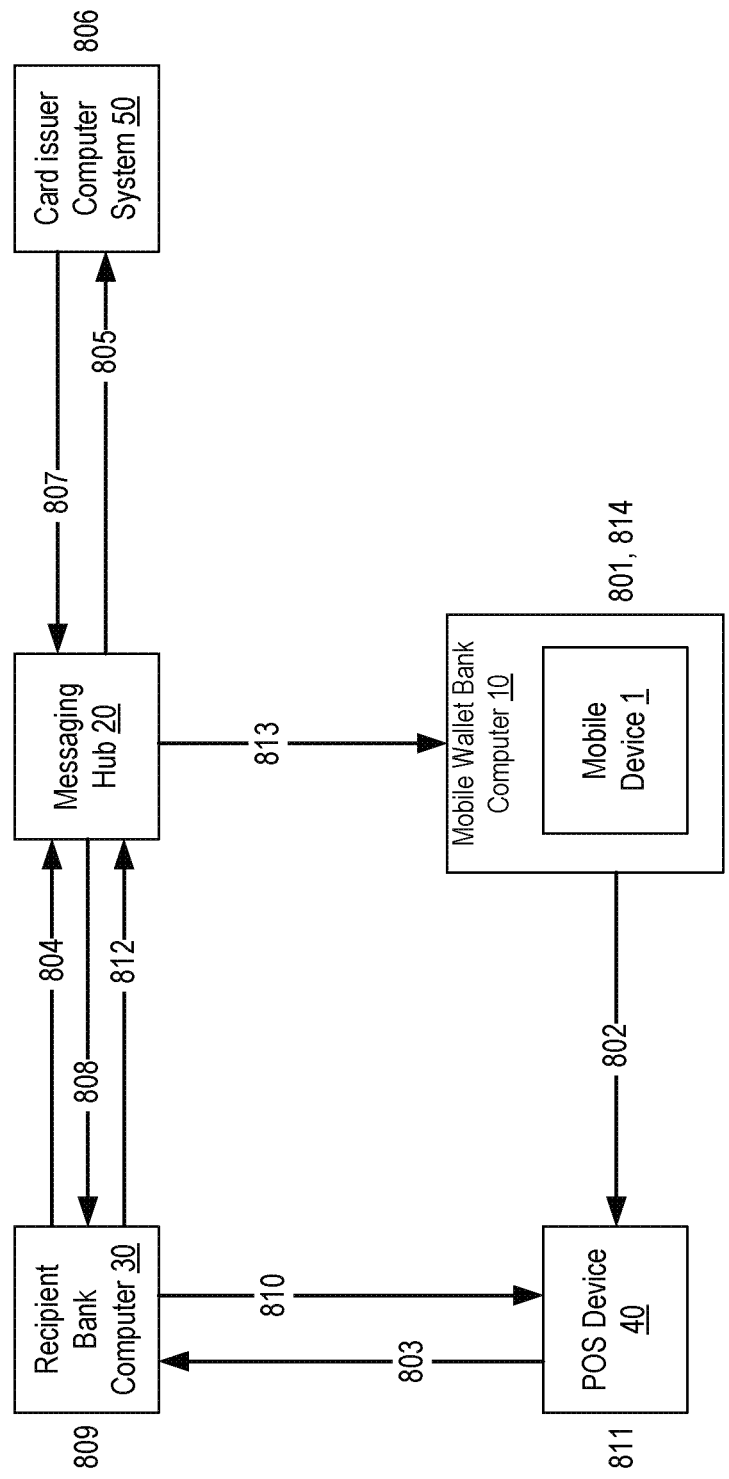
FIG. 8 is a process implemented by the payment processing system of FIG. 1.

FIG. 8 illustrates a process implemented by the payment processing system of FIG. 1 to process a refund transaction between a user and a merchant. In the embodiment shown in FIG. 8, the credit card issuer bank is different than the mobile wallet application provider. Table 4 below describes the messages that are transmitted in various steps and the content of the messages from FIG. 8. Table 4 refers to an alpha wallet that represents the mobile wallet bank computer 10 and the mobile device 1 from FIG. 8. The messaging hub that is referred to in Table 4 has the messaging hub computer system 20 from FIG. 8. The beta issuer that is referred to in Table 4 may operate or signify the card issuer computer system 50 from FIG. 8. The POS scanner referred to in Table 4 is shown in FIG. 8 as POS device 40. The recipient bank computer 30 shown in FIG. 8 is discussed in Table 4 as the gamma acquirer.

TABLE 4

| Step Name | Step Description | Msg Routing Info (TO) | Msg Routing Info (FROM) | Payload |
|---|---|---|---|---|
| 801 - Customer requests a Previously Used Dynamic Token (PUDT) for a specific transaction on the Wallet. | Consumer of Alpha Wallet or Alpha wallet identifies a Previously Used Dynamic token on the wallet server. | N/A | N/A | PUDT |

TABLE 4-continued

| Step Name | Step Description | Msg Routing Info (TO) | Msg Routing Info (FROM) | Payload |
|---|---|---|---|---|
| 802 - POS Scanner is set to Refund mode and reads or accepts the PUDT | The Alpha Wallet will either display the Previously Used Dynamic Token as a QR Code for scanning by the POS or transmit the Dynamic Token to the POS via other communication methods. Other communication methods may include NFC, Bluetooth, Hypersonic or other communication technologies | n/a - via scan | n/a - via scan | PUDT |
| 803 - POS sends the refund amount and PUDT to Gamma Acquirer | POS will send the Previously Used Dynamic Token (Track 1 or 2 Data) to its existing acquirer/processor. This will be flagged as a refund transaction. | II: Issuer Identifier as part of the PUDT | MID: Merchant ID | PUDT |
| 804 - Gamma Acquirer sends PUDT to CE | The Gamma Acquirer reads the II as part of the PUDT and sends the PUDT to the CE. This will be flagged as a refund transaction. | II: Issuer Identifier as part of the PUDT Dynamic Token | AID: Acquirer ID MID: Merchant ID | PUDT |
| 805 - CE receives DT and routes to the Beta Issuer | The CE reads the II as part of the PUDT, recognizes it as a Beta II and sends the PUDT to the Beta Issuer. This will be flagged as a refund transaction. | II: Issuer Identifier as part of the PUDT | AID: Acquirer ID MID: Merchant ID | PUDT |
| 806 - Beta Issuer confirms the PUDT's validity and retrieves the actual card number/underlying payment credential that was used for the initial purchase. | Beta issuer matches the PUDT to the original PI that was associated with the PUDT and then determines the underlying payment credential. This will be flagged as a refund transaction. | n/a | n/a | ACN/UPC: Actual Card Number/ Underlying Payment Credential |
| 807 - Beta Issuer sends the ACN/UPC to the CE | | AID: Acquirer ID MID: Merchant ID | II: Issuer Identifier | ACN/UPC: Actual Card Number/ Underlying Payment Credential |
| 808 - CE Sends the ACN/UPC to the Gamma Acquirer | CE looks at the AID associated with the message and sends the ACN/UPC to the appropriate acquirer. | AID: Acquirer ID MID: Merchant ID | II: Issuer Identifier | ACN/UPC: Actual Card Number/ Underlying Payment Credential |
| 809 - Gamma Acquirer processes a refund using the ACN/UPC | Gamma Acquirer processes a refund using the ACN/UPC via its existing process | n/a | n/a | ACN/UPC: Actual Card Number/ Underlying Payment Credential |
| 810 - Gamma Acquirer sends Refund Approve/Decline to the POS | Existing process | | | Approve/Decline |
| 811 - POS prints receipt as normal | Existing process | | | Approve/Decline |
| 812 - Gamma Acquirer sends Approval/Decline to CE | Gamma Acquirer sends Approval/Decline to CE based upon the II | II: Issuer Identifier | AID: Acquirer ID MID: Merchant ID | Approve/Decline |

TABLE 4-continued

| Step Name | Step Description | Msg Routing Info (TO) | Msg Routing Info (FROM) | Payload |
|---|---|---|---|---|
| 813 - CE sends Approval/Decline to the Alpha Wallet | CE sends Approval/Decline to the Alpha Wallet based upon the II | II: Issuer Identifier | AID: Acquirer ID MID: Merchant ID | Approve/Decline |
| 814 - Alpha Wallets sends an email and push notification to the Alpha Wallet User | Alpha Wallets sends an email and push notification to the Alpha Wallet User | | | |

The arrangement shown in FIG. 8 includes mobile device 1, messaging hub 20, recipient bank computer 30, POS device 40, and card issuer computer system 50. At step 801, the mobile device 1 may be operated by a user to request a previously used dynamic token that was used to complete a transaction, e.g., between the user and a recipient merchant. For example, the user may be presented with a display that shows previous transactions that the user of the mobile device 1 has transacted. The user may select one of the previous transactions in order to identify the dynamic token to be requested. In various embodiments, the user may be provided with the ability to search for the transaction, e.g., by searching for the name of the recipient merchant, by searching for transaction amounts within a specified dollar range, by scrolling through a historical list of transactions, or by searching using another criterion. In some embodiments, the previously used dynamic tokens may be stored on the mobile device 1, the mobile wallet bank computer system 10, the messaging hub 20, or in another location. Once the previous transaction is identified, the previously used dynamic token for the identified transaction may be retrieved from the memory of the mobile device 1, storage of the mobile wallet bank computer system 10 or the messaging hub 20, depending on where the dynamic token is stored. In various embodiments, for each previous transaction, if the associated dynamic token is not stored on the mobile device 1 or a cloud based storage that is accessible by the mobile device 1, then the location of the dynamic token is stored on the mobile device 1 or the cloud based storage.

At step 802, when the user requests a refund for a transaction, the POS device 40 may be set to refund mode to read or accept the previously used dynamic token. The mobile device 1 may communicate the previously used dynamic token to the POS device 40. For example, the mobile device 1 may display the previously used dynamic token as a QR code for a scan by the POS device 40 or transmit the dynamic token to the POS device 40 via other means of communications. Such other communication methods may include, for example, near field communication (NFC), Bluetooth, Hypersonic or other communication technologies. The message routing information in step 802 may be the previously used dynamic token being scanned or transmitted by or from the POS scanner 40 or the mobile device 1.

Next, at step 803, the POS device 40 may send the previously used dynamic token to the recipient bank computer 30. The POS device 40 may determine the amount of funds that were transferred using the previously used dynamic token. In some embodiments, determining the amount of funds may include accessing a database using the previously used dynamic token to identify a transaction and retrieving the transaction amount from the database. The transaction amount and the previously used dynamic token may be sent to the recipient bank computer 30 in a message that identifies the transaction as being a refund transaction. The previously used dynamic token may comprise track 1 and track 2 data. The message to the recipient bank computer 30 may include a merchant identifier and an issuer identifier that identifies the issuer of the credit card that was used for the original transaction. In some embodiments, the issuer identifier may be part of the previously used dynamic token.

At step 804, after receiving the previously used dynamic token, the recipient bank computer 30 may send the previously used dynamic token including the issuer identifier to the messaging hub 20. The information that is sent to the messaging hub 20 may include an acquirer identifier and a merchant identifier from the recipient bank computer 30. Providing the acquirer identifier and the merchant identifier allows the messaging hub 20 to identify the recipient bank computer 30 when sending the refund at step 808.

At step 805, the messaging hub 20 receives the previously used dynamic token and routes the previously used dynamic token to the card issuer computer system 50. The messaging hub 20 determines the identity of the card issuer computer system 50. The messaging hub 20 reads a portion of the previously used dynamic token to determine which card issuer computer system 50 should receive the dynamic token. Moreover, the messaging hub 20 may additionally flag the transaction as a refund transaction to the card issuer computer system 50 in one embodiment.

Next, at step 806, the card issuer computer system 50 may confirm the previously used dynamic token's validity and retrieve the actual card number/underlying payment credential that was used for the original purchase transaction. In one embodiment, the card issuer computer system 50 matches the previously used dynamic token to the original payment identifier that was associated with the previously used dynamic token and determines the underlying payment credential. The card issuer computer system 50 may determine the actual card number and/or the underlying payment credentials.

At step 807, after identifying the actual card number or underlying payment credentials, the card issuer computer system 50 sends the actual card number or underlying payment credentials, acquirer identifier, merchant identifier and issuer identifier to the messaging hub 20. The actual card number/underlying payment credential allows the messaging hub 20 or the recipient bank computer 30 to process a refund from the card issuer computer system 50 to the payor of the mobile device 1. The results from step 806 may be sent by the card issuer computer system 50 to the messaging hub 20.

At step 808, the messaging hub 20 may send the actual card number or the payment credentials to the recipient bank computer 30 in order to process a refund using the actual card number or the payment credentials. The messaging hub 20 determines the acquirer identifier associated with the recipient bank computer 30. The messaging hub 20 sends the actual card number or the underlying payment credential to the appropriate acquirer. In some embodiments, the message may be sent to the recipient bank computer 30 to process the refund.

Next, at step 809, the recipient bank computer 30 may process a refund using the actual card number or the underlying payment credentials. In one embodiment, the recipient bank computer 30 may process the refund to the account of the actual card number. In another embodiment, the owner of the mobile wallet or the mobile device 1 may be provided with store credit that will be honored at the POS device 40. In another embodiment, a gift card identifier number may be transmitted to the mobile wallet bank computer 10.

At step 810, the recipient bank computer 30 may send a refund approval/decline to a POS device 40 or other POS computers. At step 811, assuming an approval is sent, a refund receipt may be printed at the POS device 40. In other embodiments, the refund may also be declined for various reasons by the POS device 40. For example, a refund may be declined based on the policies that are specified by the owner of the POS device 40. When the refund is declined a receipt may be printed that informs the payor the reason or reasons for the refund being declined. In other embodiments, the reasons for the refund decision may be sent to the mobile device 1 via the messaging hub 20.

At step 812, the approval/decline decision may be sent to the messaging hub 20 by the recipient bank computer 30. In some embodiments, at step 812 the recipient bank computer 30 includes the issuer identifier, acquirer identifier and the merchant identifier with the approval or decline decision.

At step 813, the approval/decline decision may be received by the messaging hub 20 and the approval/decline decision message may be sent to the mobile wallet bank computer 10. The mobile wallet bank computer system 10 may transmit the decision to the mobile device 1. In some embodiments, the content of the message may include the issuer identifier, acquirer identifier, merchant identifier and the approval/decline decision.

Next at step 814, the software on mobile device 1 or mobile wallet bank computer 10 may send an e-mail or push notification to the mobile wallet application. The approval or decline decision may be stored on the mobile device 1.

In other embodiments, the refund functionality described above in FIG. 8 may also be used to offer refunds for recurring transactions that occur periodically. These transactions can occur using various payment types, such as but not limited to, demand deposit account, debit card, credit card or other forms of payment. For recurring transactions, the system described above may be configured to have a persistent token (e.g. special token or specially flagged token) that does not expire or can be used multiple times. For example, in the case of a recurring cable company bill, the cable company may use the same token on a periodic basis (e.g. monthly, yearly, weekly or quarterly). The merchant (in this example, the cable company) may retain the recurring token and present the same token for funds. In other embodiments, the messages for a persistent token may include a flag during the debit/credit charge that identifies the token as a recurring token.

In other examples, at the end of the recurring transaction relationship, the messaging hub computer system 20 may send a message to the merchant to deactivate the recurring token and discard the token. In other embodiments, the messaging hub computer system 20 may update its storage records such that, when a transaction is initiated using a deactivated recurring token, the messaging hub computer system 20 informs the issuing bank computer system 50 that an attempt to use a deactivated recurring token has been initiated.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   receiving, by a financial institution computer system, a previously used token from a point of sale (POS) device, the previously used token identifying a previous transaction between a merchant and a payor associated with the financial institution computer system;
   transmitting, by the financial institution computer system, the previously used token to a network computer system;
   receiving, by the financial institution computer system, a payment credential from the network computer system, the payment credential associated with the previous transaction; and
   processing, by the financial institution computer system, a refund using the payment credential.

2. The method of claim 1, further comprising determining, by the financial institution computer system, an issuer identifier based on the previously used token, the issuer identifier associated with an issuer of a credit card utilized in the previous transaction.

3. The method of claim 1, further comprising transmitting, by the financial institution computer system, an approval indicator or a decline indicator to the POS device;
   wherein the refund is processed only when the financial institution computer system has transmitted the approval indicator or will transmit the approval indicator.

4. The method of claim 3, further comprising transmitting, by the financial institution computer system, the approval indicator or the decline indicator to the network computer system.

5. The method of claim 1, further comprising receiving, by the financial institution computer system, a transaction amount associated with the previous transaction from the POS device.

6. The method of claim 5, wherein the transaction amount and the previously used token are received by the financial institution computer system in a single message.

7. The method of claim 1, further comprising transmitting, by the financial institution computer system, an acquirer identifier to the network computer system along with the previously used token, the acquirer identifier associated with the financial institution computer system.

8. The method of claim 7, wherein the acquirer identifier is included in the previously used token.

9. The method of claim 1, further comprising determining, by the financial institution computer system, an account associated with the payment credential;
   wherein processing the refund using the payment credential comprises processing the refund to the account.

10. The method of claim 1, wherein the financial institution computer system transmits the payment credential, after transmitting the previously used token to the network computer system.

11. The method of claim 1, wherein receiving the previously used token includes receiving an indication that the merchant and the payor are engaged in a refund transaction.

12. The method of claim 1, wherein the previously used token facilitates identification of an issuer computer system based on a portion of the previously used token and facilitates processing of the refund.

13. The method of claim 12, wherein the payment credential is received from the issuer computer system via the network computer system.

14. The method of claim 12, further comprising identifying, by the financial institution computer system, the payor using the payment credential;
   wherein the refund is processed by the financial institution computer system after the payor is identified by the financial institution computer system.

15. A computer-implemented method, comprising:
   transmitting, by a financial institution computer system, a previously used token to a network computer system, the previously used token identifying a previous transaction associated with a merchant and a payor;
   receiving, by the financial institution computer system, a payment credential from the network computer system, the payment credential associated with the previous transaction;
   transmitting, by the financial institution computer system, an approval indicator or a decline indicator to a point of sale (POS) device based on the payment credential; and
   processing, by the financial institution computer system, a refund using the payment credential only when the financial institution computer system has transmitted the approval indicator or will transmit the approval indicator.

16. The method of claim 15, further comprising:
   determining, by the financial institution computer system, an issuer identifier based on the previously used token, the issuer identifier associated with an issuer of a credit card utilized in the previous transaction;
   transmitting, by the financial institution computer system, the approval indicator or the decline indicator to the network computer system; and
   determining, by the financial institution computer system, an account associated with the payment credential;
   wherein processing the refund using the payment credential comprises processing the refund to the account.

17. The method of claim 16, further comprising:
   receiving, by the financial institution computer system, a transaction amount associated with the previous transaction from the POS device; and
   transmitting, by the financial institution computer system, an acquirer identifier to the network computer system along with the previously used token, the acquirer identifier associated with the financial institution computer system;
   wherein the financial institution computer system transmits the payment credential after transmitting the previously used token to the network computer system;
   wherein the previously used token facilitates identification of an issuer computer system based on a portion of the previously used token and facilitates processing of the refund; and
   wherein the payment credential is received from the issuer computer system via the network computer system.

18. The method of claim 17, further comprising identifying, by the financial institution computer system, the payor using the payment credential;
   wherein the refund is processed by the financial institution computer system after the payor is identified by the financial institution computer system.

19. A computer-implemented method, comprising:
   transmitting, by a financial institution computer system, a previously used token to a network computer system, the previously used token identifying a previous transaction;
   receiving, by the financial institution computer system, a payment credential from an issuer computer system via the network computer system, the payment credential associated with the previous transaction;
   processing, by the financial institution computer system, a refund using the payment credential; and
   identifying, by the financial institution computer system, a payor using the payment credential;
   wherein the previously used token facilitates identification of the issuer computer system based on a portion of the previously used token and facilitates processing of the refund; and
   wherein the refund is processed by the financial institution computer system after the payor is identified by the financial institution computer system.

20. The method of claim 19, further comprising:
   determining, by the financial institution computer system, an issuer identifier based on the previously used token, the issuer identifier associated with an issuer of a credit card utilized in the previous transaction;
   receiving, by the financial institution computer system, a transaction amount associated with the previous transaction;
   transmitting, by the financial institution computer system, an acquirer identifier to the network computer system along with the previously used token, the acquirer identifier associated with the financial institution computer system; and
   determining, by the financial institution computer system, an account associated with payment credential;
   wherein the financial institution computer system transmits the payment credential, after transmitting the previously used token to the network computer system.

* * * * *